United States Patent
Kruse et al.

(10) Patent No.: US 10,567,388 B1
(45) Date of Patent: Feb. 18, 2020

(54) AUTOMATIC ACCOUNT RESOURCE AND POLICY DECOMMISSIONING

(71) Applicant: Amazon Technologies, Inc., Seattle, WA (US)

(72) Inventors: William Frederick Hingle Kruse, Seattle, WA (US); Jeffrey John Wierer, Redmond, WA (US); Nima Sharifi Mehr, Vancouver (CA); Ashish Rangole, Seattle, WA (US); Kunal Chadha, Seattle, WA (US); Bharath Mukkati Prakash, Bellevue, WA (US); Radu Mihai Berciu, Seattle, WA (US); Kai Zhao, Seattle, WA (US); Hardik Nagda, Seattle, WA (US); Chenxi Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/087,007

(22) Filed: Mar. 31, 2016

(51) Int. Cl.
*G06F 17/00* (2019.01)
*H04L 29/06* (2006.01)

(52) U.S. Cl.
CPC .......... *H04L 63/102* (2013.01); *H04L 63/20* (2013.01)

(58) Field of Classification Search
CPC ... H04L 43/0876; H04L 43/16; H04L 47/783; H04L 67/125; H04L 47/24; G06F 21/70
See application file for complete search history.

(56) References Cited

U.S. PATENT DOCUMENTS

| | | | |
|---|---|---|---|
| 6,587,865 B1 * | 7/2003 | Kimbrel | G06F 9/4881 711/141 |
| 8,769,604 B2 | 7/2014 | Buss | |
| 8,843,734 B2 | 9/2014 | Lim | |
| 8,880,666 B2 | 11/2014 | Aaron et al. | |
| 9,652,432 B2 * | 5/2017 | de Souza | G06F 13/4295 |
| 2003/0149888 A1 | 8/2003 | Yadav | |
| 2003/0154776 A1 * | 8/2003 | Naik | G01D 3/10 73/114.73 |
| 2004/0148394 A1 * | 7/2004 | Circenis | G06F 21/70 709/226 |
| 2008/0028436 A1 | 1/2008 | Hannel et al. | |
| 2008/0178278 A1 | 7/2008 | Grinstein et al. | |
| 2009/0327791 A1 * | 12/2009 | Aerts | G06F 1/08 713/500 |
| 2012/0209998 A1 * | 8/2012 | Svarfvar | G06Q 30/02 709/225 |

(Continued)

Primary Examiner — Maung T Lwin
Assistant Examiner — Lizbeth Torres-Diaz
(74) *Attorney, Agent, or Firm* — Davis Wright Tremaine LLP

(57) ABSTRACT

A policy/resource decommissioning service determines whether a resource has been inactive for a period of time greater than at least one period of time threshold for decommissioning. If the resource has been inactive greater than a first period of time threshold, the service disables the resource such that requests to access the resource are denied. If the resource has been inactive for a period of time greater than a second threshold, longer than the first period of time threshold, the service archives the resource. The service deletes the resource if the inactivity period of the resource is greater than a third period of time threshold, where the third period of time threshold is longer than the first and the second period of time thresholds.

20 Claims, 12 Drawing Sheets

(56) References Cited

U.S. PATENT DOCUMENTS

| | | | |
|---|---|---|---|
| 2012/0222002 A1* | 8/2012 | Harrison | G06F 11/328 717/113 |
| 2013/0160073 A1 | 6/2013 | You | |
| 2014/0007184 A1 | 1/2014 | Porras | |
| 2014/0137178 A1* | 5/2014 | Thom | G06F 21/6218 726/1 |
| 2014/0229739 A1 | 8/2014 | Roth et al. | |
| 2014/0380402 A1* | 12/2014 | Roth | G06F 21/64 726/1 |
| 2015/0229538 A1 | 8/2015 | Burke et al. | |
| 2016/0036722 A1* | 2/2016 | Obrecht | G06F 9/50 709/226 |
| 2016/0188377 A1* | 6/2016 | Thimmappa | G06F 16/285 718/104 |

\* cited by examiner

US 10,567,388 B1

AUTOMATIC ACCOUNT RESOURCE AND POLICY DECOMMISSIONING

BACKGROUND

Computing resource service providers and other service providers often maintain and operate various computing resources on behalf of their customers. For instance, customers of these service providers can submit a request to provision various computing resources to satisfy their business needs. However, over time, a customer and any other delegated users may stop using some of these computing resources, which may result in greater administrative costs to the customer. Further, as these computing resources become inactive within a customer's account, the risk for unauthorized entities to gain access to and to utilize these inactive computing resources increases, which can result in additional expense to the customer. While removing these computing resources would resolve these issues, customers of these service providers may later realize that these computing resources are necessary.

BRIEF DESCRIPTION OF THE DRAWINGS

Various techniques will be described with reference to the drawings, in which.

DETAILED DESCRIPTION

Figure 1:
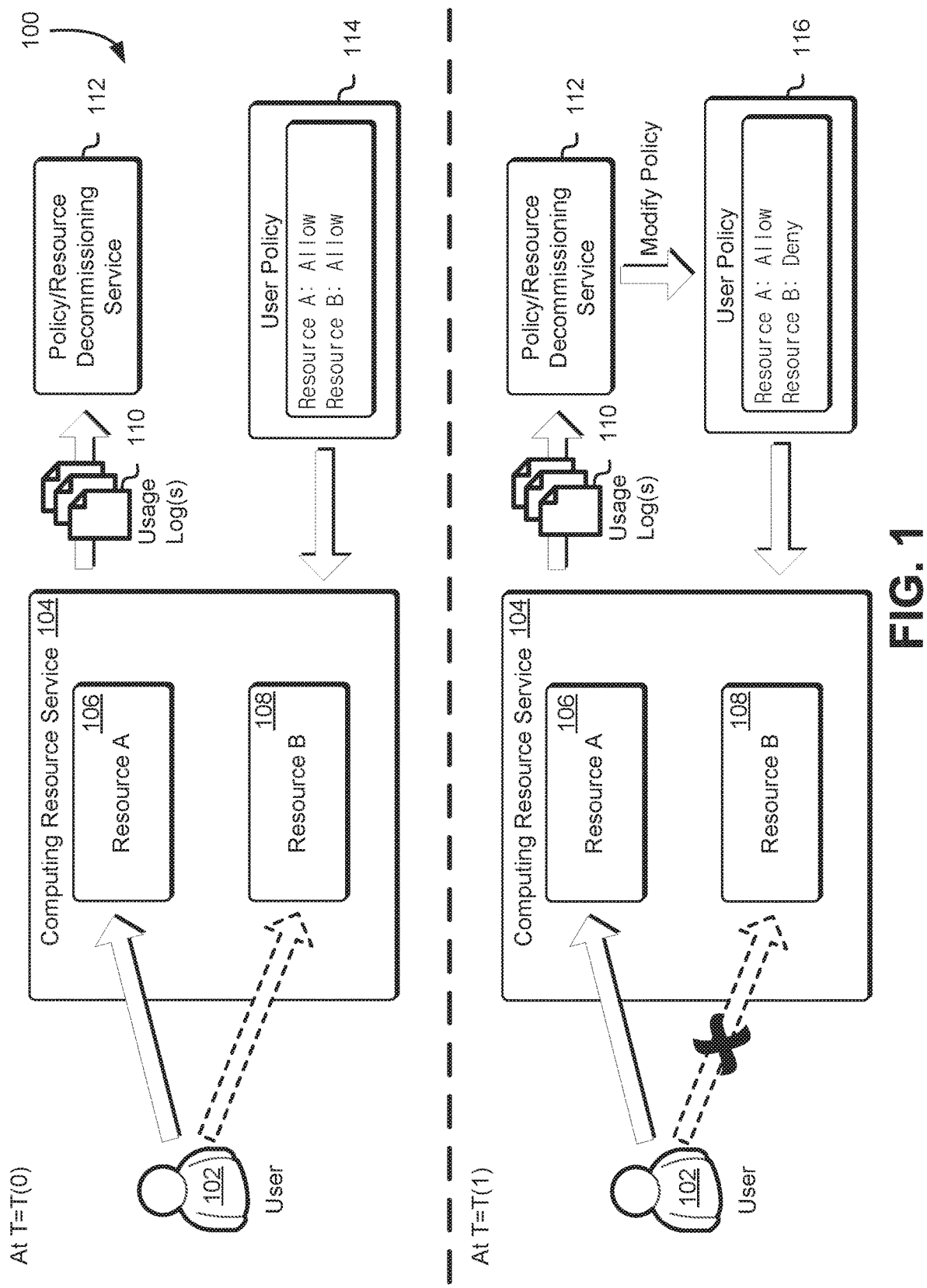
FIG. 1 shows an illustrative example of an environment in which a user policy is updated to deny access to an unused resource based at least in part on a determination that a first threshold has been reached for the unused resource in accordance with at least one embodiment.

This disclosure relates to the identification of inactive computing resources and computing resource policies to enable automatic decommissioning of these inactive computing resources and computing resources policies based on temporal thresholds associated with inactivity periods. In an example, a customer or other administrator of the customer's account submits a request to a policy/resource decommissioning service to monitor usage data associated with the customer's computing resources and associated policies to identify inactive computing resources and policies. The customer may provide, to the policy/resource decommissioning service, a configuration file, which may specify the computing resources and associated policies that are to be monitored. Further, the configuration file may define certain thresholds for periods of inactivity. The policy/resource decommissioning service may perform various operations based on the particular threshold that has been surpassed by an inactivity period of a computing resource or a policy, as defined by the customer in the configuration file. Through the configuration file, a customer may further define notification settings that may be used by the policy/resource decommissioning service to transmit notifications to the customer in the event that any actions are taken with regard to inactive computing resources or policies. If the customer does not provide a configuration file for the decommissioning of inactive resources and policies, the policy/resource decommissioning service may use a default decommissioning configuration for the customer's resources and policies.

In response to the customer's request to monitor its resources and policies to determine whether to initiate decommissioning of any of these resources and policies, the policy/resource decommissioning service may configure usage aggregators associated with computing resource services utilized by the customer to obtain usage data for the customer's resources and policies. As the policy/resource decommissioning service receives usage data from these usage aggregators, the policy/resource decommissioning service may determine the inactivity period for each of the customer's computing resources and policies. Based on the specified time period thresholds in the configuration file or as defined by the default decommissioning configuration, the policy/resource decommissioning service may determine whether the inactivity period for any of the customer's identified computing resources and policies exceeds a first time period threshold. If the policy/resource decommissioning service determines that a policy has been inactive for a period of time greater than the first time period threshold, the policy/resource decommissioning service may disable the policy. Alternatively, if the policy/resource decommissioning service determines that a computing resource has been inactive for a period of time greater than the first time period threshold, the policy/resource decommissioning service may modify any existing policies associated with the computing resource to deny access to the computing resource. In some examples, the policy/resource decommissioning service creates a new policy associated with the computing resource that would deny access to the computing resource and supersedes any existing policies associated with the computing resource.

In an example, the policy/resource decommissioning service continues to monitor usage data obtained from the usage aggregators to determine whether any of the customer's computing resources or policies have been inactive over a period of time greater than a second period of time threshold, as either specified in the configuration file or as part of the default decommissioning configuration. If any of the customer's computing resources or policies have been inactive over a period of time greater than the second period of time threshold, the policy/resource decommissioning service may evaluate the configuration file or, if not available, the default decommissioning configuration, to determine whether the identified computing resources and policies are to be archived or deleted. For instance, a customer may specify, through the configuration file, that certain computing resources and policies, if inactive over a period of time greater than the second period of time threshold, are to be archived by transferring these computing resources and policies to an archive storage service or by archiving these computing resources and policies locally in their corresponding computing resource services. Alternatively, the customer may specify, in the configuration file, that these certain computing resources and policies are to be permanently deleted if they are inactive over a period of time greater than the second period of time threshold. Accordingly, the policy/resource decommissioning service may either archive or delete any of the customer's computing resources or policies that have been inactive over a period of time greater than the second period of time threshold defined in the configuration file or in the default decommissioning configuration.

The policy/resource decommissioning service may continue to monitor usage data from the various computing resource service where the customer's computing resources are maintained to determine whether any of the customer's computing resources or policies have been inactive over a period of time greater than a third period of time threshold as defined in the configuration file or in the default decommissioning configuration. By default, the policy/resource decommissioning service may delete any computing resources and policies that have been inactive for a period of time greater than the third period of time threshold. For instance, if the policy/resource decommissioning service determines that a particular computing resource or policy has been inactive for a period of time that exceeds this third threshold, the policy/resource decommissioning service may determine whether this computing resource or policy is archived locally within its corresponding computing resource service or within a separate archive storage service, as described above. Based on this determination, the policy/resource decommissioning service may transmit a request to the corresponding computing resource service or to the archive storage service to delete the identified computing resource or policy. In response to an indication that the identified computing resource or policy has been deleted, the policy/resource decommissioning service may notify the customer to indicate that as a result of the third threshold having been exceeded, the computing resource or policy has been permanently deleted.

In this manner, a customer or other administrator of a customer's account can examine and monitor which computing resources and policies are in the process of being retired by the policy/resource decommissioning service. Further, the customer may be provided with a notification from the policy/resource decommissioning service such that the customer may be aware when a computing resource or policy has been inactive over a period of time that is greater than any of the thresholds specified in the configuration file or in the default decommissioning configuration. In addition, the techniques described and suggested within the present disclosure facilitate additional technical advantages. For instance, because the policy/resource decommissioning service transmits notifications to the customer or other administrator of the customer's account in response to actions performed on inactive computing resources and policies, a customer or other administrator may determine whether to re-activate any of the disabled policies or computing resources. Thus, the customer or other administrator of the customer's account may prevent policies or computing resources from being permanently deleted if there is still a need to maintain these inactive policies or computing resources.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which a user policy is updated to deny access to an unused resource 108 based at least in part on a determination that a first threshold has been reached for the unused resource 108 in accordance with at least one embodiment. In the environment 100, a user 102 of a computing resource service 104 can interact with one or more computing resources 106, 108 provisioned by a customer of a computing resource service provider. User access to the one or more computing resources 106, 108 may be subject to a user policy 114, which may be applied to incoming requests from various users, including user 102, for access to a computing resource. The user policy 114 is a collection of permissions associated with a user, a group, a role, an organization, a company, or some other such entity. Each permission may be associated with a computing resource and may specify whether the entity (also referred to herein as a "principal") may access that resource, under what conditions access may be allowed or denied, and/or what type of access may be allowed or denied. For example, a permission may specify that a user named "USER1" may access a certain data storage device denoted by identifier "12345." A more detailed permission may specify that USER1 may only read from resource 12345, but may not write to resource 12345. A still more detailed permission may specify that USER1 may read from resource 12345 at any time, but may only write to resource 12345 between the hours of 9:00 and 9:30 AM. Permissions may also be associated with classes or collections of resources so that, for example, USER1 may have access to a collection of data storage devices, one of which may be resource 12345. Principals may include individual users, accounts, computing resource services, or other principal entities that are allowed or denied access to a computing resource.

Computing resource policies, such as the user policy 114 and other active policies may be maintained by a policy management service and may be stored in a policy database, which may be a distributed database in a distributed system with multiple nodes that access the policies. In an embodiment, a customer with privileges for modifying permissions and/or for modifying a set of policies (e.g., an administrator or such other user with privileges for modifying a set of policies, also referred to herein as a "privileged user") of an organization may communicate with the policy management service using one or more application programming interface (API) calls to request creation of policies, editing of policies, or deletion of policies. Such policy modification activities (e.g., creating and editing) may also be referred to herein as "authoring" a policy. The policies may, for example, be utilized to establish, for one or more users, a level of access to one or more resources provisioned by or for the organization and, generally, access rights with respect to the one or more resources provisioned by/for the organization. The organization may be a user of a computing resource service provider that utilizes one or more services such as a virtual computer system service, object-based data storage services, database services, a policy management service and configuration and management service as well as a plurality of other services to create and manage resources and to support operational needs.

In an embodiment, a computing resource service 104, in response to a request from a user 102 to access one or more computing resources provided by the computing resource service 104, obtains a user policy 114 from the policy management service that may be used to determine whether the user 102 is authorized to access the one or more computing resources. For instance, as illustrated in FIG. 1, the user 102 is authorized to access computing resource 106 (e.g., Resource A) and computing resource 108 (e.g., Resource B). However, in this illustrative example, the user 102 has opted to only utilize computing resource 106, while leaving computing resource 108 unused. Based at least in part on the user's usage of the various computing resources made available by the computing resource service 104, the computing resource service 104 may generate one or more data usage logs 110, which may specify user access to the computing resources and the periods of activity associated with these computing resources.

A customer of the computing resource service provider may transmit a request to a policy/resource decommissioning service 112 to monitor the data usage logs 110 generated by the computing resource service 104 to identify inactive computing resources and policies that may be associated with the customer's provisioned computing resources. The customer, through the request, may provide a configuration file that may be used by the policy/resource decommissioning service 112 to determine which computing resources and policies to monitor and to determine whether the inactivity period for any of these computing resources or policies exceed one or more time period thresholds. Additionally, the configuration file may specify one or more operations to be performed if a period of inactivity for a computing resource or policy exceeds a period of time threshold as defined therein. For example, a customer or other administrator of the customer's account may specify that after a first period of time threshold, policies associated with an inactive resource are to be modified to deny all access to the inactive resource. Alternatively, the customer or other administrator of the customer's account may specify that a new policy be generated that supersedes any existing policies associated with the inactive resource and, if applied, would deny all access to the inactive resource. As will be described in greater detail below, a customer may define one or more period of time thresholds and actions to be performed in the event that any of these period of time thresholds are exceeded.

The policy/resource decommissioning service 112 may comprise one or more computer systems that monitor incoming data usage logs 110 and other usage data from various computing resource services to determine periods of inactivity for computing resources and policies. These one or more computer systems of the policy/resource decommissioning service 112 may evaluate the configuration file provided by the customer or other administrator of the customer's account to determine what actions are to be performed in response to a determination that a period of inactivity for a particular computing resource or policy exceeds a defined period of time threshold. In some embodiments, if the customer does not provide a configuration file specifying the period of time thresholds or the actions to be performed by the policy/resource decommissioning service 112 in response to a determination that a period of inactivity for a particular computing resource or policy exceeds a defined period of time threshold, the policy/resource decommissioning service 112 may utilize a default decommissioning configuration to identify the one or more default period of time thresholds and actions to be performed in response to a threshold being exceeded. While computing resources and policies are used extensively throughout the present disclosure, other security elements may be subject to decommissioning based at least in part on the configuration file provided by a customer or the default decommissioning configuration of the policy/resource decommissioning service 112. For instance, user credentials, user groups, principals, and the like may be subject to decommissioning as specified in the configuration file or in the default decommissioning configuration of the policy/resource decommissioning service 112.

In response to the customer's request to initiate monitoring of the data usage logs 110 generated by the computing resource service 104, the policy/resource decommissioning service 112 may obtain data usage logs 110 from the computing resource service 104 as they are being generated. The policy/resource decommissioning service 112 may evaluate these data usage logs 110 to identify any inactive resources and policies associated with the customer. For example, as illustrated in FIG. 1, computing resource 108 (e.g., Resource B) is inactive, as the user 102 has not accessed the computing resource 108. If the policy/resource decommissioning service 112 determines that a computing resource or policy has been inactive for a period of time, the policy/resource decommissioning service 112 may compare the length of this period of inactivity to the first period of time threshold defined by the customer through the configuration file or, if a configuration file was not provided, through the default decommissioning configuration. If the period of inactivity for the computing resource or policy exceeds the first period of time threshold (e.g., the earliest time at which one or more decommissioning actions may be performed), the policy/resource decommissioning service 112 may revise one or more policies associated with the computing resource to deny further access to the computing resource. Alternatively, if it is a policy that has been inactive for a greater period of time than the first period of time threshold, the policy/resource decommissioning service 112 may disable the inactive policy.

As an illustrative example, in FIG. 1, the policy/resource decommissioning service 112 determines, based at least in part on obtained data usage logs 110, that computing resource 108 has been inactive over a period between T(0) and T(1). If the period of inactivity (e.g., T(1)–T(0), as illustrated in FIG. 1) is greater than the first period of time threshold, then the policy/resource decommissioning service 112 may perform one or more operations as specified in the configuration file or, if not provided, in the default decommissioning configuration. For instance, the policy/resource decommissioning service 112 may modify the user policy 114 associated with the user 102 and defining a level of access to the computing resource 108 to deny further access to the computing resource 108. Thus, if a user 102 submits a request to access the computing resource 108, the computing resource service 104 may obtain the modified user policy 116 and, based at least in part on the permissions specified in the modified user policy 116, deny the request. In some embodiments, the policy/resource decommissioning service 112, rather than modifying an existing user policy 114 to deny further access to the inactive computing resource 108, can generate a new user policy that can be used to deny further access to the computing resource 108. This newly created user policy may supersede any existing user policies such that the computing resource service 104 may evaluate this newly created user policy and deny and user requests to access the inactive computing resource 108.

Figure 2:
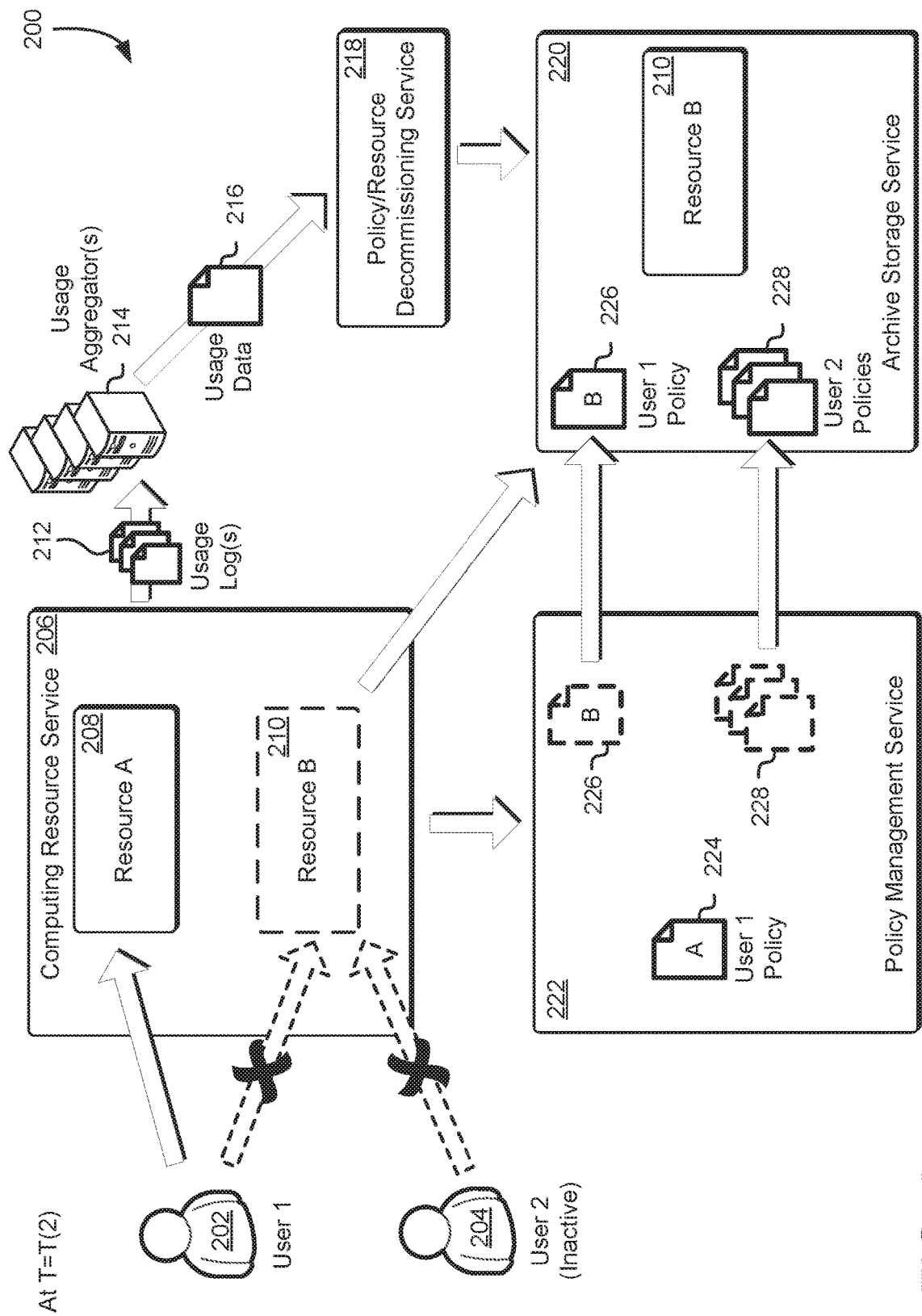
FIG. 2 shows an illustrative example of an environment in which unused policies and resources are transferred to an archive storage service based at least in part on a determination that a second threshold has been reached for the unused policies and resources in accordance with at least one embodiment.

FIG. 2 shows an illustrative example of an environment 200 in which unused policies 226, 228 and resources 210 are transferred to an archive storage service 220 based at least in part on a determination that a second threshold has been reached for the unused policies and resources in accordance with at least one embodiment. In the environment 200, the policy/resource decommissioning service 218 may obtain usage data 216 from one or more usage aggregators associated with the computing resource service 206 and any other computing resource services that may include the customer's provisioned computing resources. The one or more usage aggregators 214 may comprise one or more computer systems that obtain data usage logs 212 from the computing resource service 206 and other computing resource services associated with the customer's provisioned computing resources and aggregates data from these data usage logs 212 based at least in part on various criteria and metrics. For instance, the usage aggregators 214 may organize the data from the data usage logs 212 according to various usage metrics (e.g., time of use, access requests received, data input/output for the computing resource, etc.) and computing resource identifiers. In some instances, the usage aggregators 214 may indicate the length of time for any period of inactivity corresponding to the computing resources if the period of inactivity is current. The usage aggregators 214 may compile the data from the data usage logs 212 to generate one or more usage data reports 216 for use by the policy/resource decommissioning service 218.

The policy/resource decommissioning service 218 may determine, based at least in part on the usage data reports 216 obtained from the usage aggregators 214, whether any computing resources or policies have been inactive for a period of time greater than a second period of time threshold. For instance, the policy/resource decommissioning service 218 may maintain a record of computing resources for which policies have been modified or created to deny access to these computing resources as a result of these computing resources being inactive for a period of time greater than a first period of time threshold. Similarly, the policy/resource decommissioning service 218 may maintain a record of disabled policies that have been disabled for having been inactive for a period of time greater than the first period of time threshold. The policy/resource decommissioning service 218 may monitor these inactive computing resources and disabled policies to determine whether they continue to be inactive and, if so, whether the period of inactivity exceeds the second period of time threshold.

In some embodiments, if the policy/resource decommissioning service 218 detects that a computing resource or policy has been inactive for a period of time greater than the second period of time threshold, and the policy/resource decommissioning service 218 has not performed any actions corresponding to the first period of time threshold, the policy/resource decommissioning service 218 can perform the actions corresponding to the first period of time threshold. For instance, the policy/resource decommissioning service 218 may create a new policy or modify one or more existing policies to deny all access to the inactive computing resource. Alternatively, if the policy/resource decommissioning service 218 determines that a policy has been inactive for a period of time greater than a second period of time threshold, as defined in the configuration file or in the default decommissioning configuration, the policy/resource decommissioning service 218 may disable the inactive policy. While actions such as modification, creation, or disabling of policies are used throughout the present disclosure to demonstrate actions that may be performed if an inactivity period exceeds a first period of time threshold, other actions may be performed in accordance with the configuration file provided by the customer or the default decommissioning configuration of the policy/resource decommissioning service 218. For example, instead of modifying, creating, or disabling policies, the policy/resource decommissioning service 218 may migrate the inactive computing resource to older hardware of the computing resource service 206.

If the policy/resource decommissioning service 218 determines that the inactivity period for a computing resource or policy exceeds the second period of time threshold, the policy/resource decommissioning service 218 may evaluate the configuration file provided by the customer or other administrator to determine whether to archive the inactive computing resource or policy locally (e.g., within the source service) or within an archive storage service 220. The archive storage service 220 may comprise one or more computer systems and one or more storage devices for archival data storage. The one or more computer systems of the archive storage service 220 may obtain the inactive computing resources and policies from their corresponding services and store these inactive computing resources and policies using a subset of the one or more storage devices. In some embodiments, the customer provisions, from the archive storage service 220, a subset of the one or more storage devices for its use. Thus, the archive storage service 220 may identify the customer's subset of the one or more storage devices and utilize this subset to store the customer's inactive computing resources and policies.

If the policy/resource decommissioning service 218 determines that the inactive computing resource or policy is to be stored within an archive storage service 220, the policy/resource decommissioning service 218 may transmit a request to the archive storage service 220 to obtain the inactive computing resource or policy from the corresponding services. For instance, as illustrated in FIG. 2, computing resource 210 (e.g., Resource B) and user policies 226, 228 have been inactive for a period of time that exceeds the second period of time threshold. In response, the archive storage service 220 may transmit a request to the computing resource service 206 to obtain the computing resource 210 for archival storage. Similarly, the archive storage service 220 may transmit a request to the policy management service 222 to obtain the user policies 226, 228 for archival storage. In an alternative embodiment, the policy/resource decommissioning service 218 can transmit a request to the computing resource service 206 and to the policy management service 222 to provide the inactive computing resource 210 and the inactive user policies 226, 228 to the archive storage service 220.

In some embodiments, if the configuration file or default decommissioning configuration of the policy/resource decommissioning service 218 indicates that any inactive computing resources or policies are to be archived locally (e.g., within their respective services), the policy/resource decommissioning service 218 transmits a request to the computing resource service 206 to utilize one or more storage devices of the service to archive the inactive computing resource. While the computing resource is stored within these one or more storage devices for archival purposes, the computing resource may be unavailable to users. If an inactive policy is to be archived locally, the policy/resource decommissioning service 218 may transmit a request to the policy management service 222 to provision or otherwise utilize one or more storage devices of the policy management service 222 to archive the inactive policy.

To illustrate this process, as illustrated in FIG. 2, the policy/resource decommissioning service 218 determines, based at least in part on usage data records 216 generated by the one or more usage aggregators 214, that computing resource 210 has been inactive for a period of time greater than the second period of time threshold. Further, the policy/resource decommissioning service 218 determines, based at least in part on the usage data records 216, that user 204 (e.g., User 2) has also been inactive for a period of time greater than the second period of time threshold. In response to this determination, the policy/resource decommissioning service 218 may transmit a request to the archive storage service 220 to obtain computing resource 210 from the computing resource service 206. Further, the policy/resource decommissioning service 218 may transmit a request to the archive storage service 220 to obtain inactive policies 228 associated with user 204 and an inactive policy 224, 226 corresponding to permissions provided to user 202 to access computing resource 210. These requests may cause the archive storage service 220 to transmit requests to the computing resource service 206 and to the policy management service 222 to obtain computing resource 210, inactive policy 224, 226, and inactive policies 228. Thus, computing resource 210 may be unavailable to user 202 and user 204 should either user transmit a request to the computing resource service 206 to access computing resource 210. Further, if user 204 submits a request to the computing resource service 206 to access any computing resources, the computing resource service 206 may determine that no user policies are available for user 204 and, as a result, may deny the request. User 202 may still be able to access computing resource 208, as computing resource 208 has not been inactive.

Figure 3:
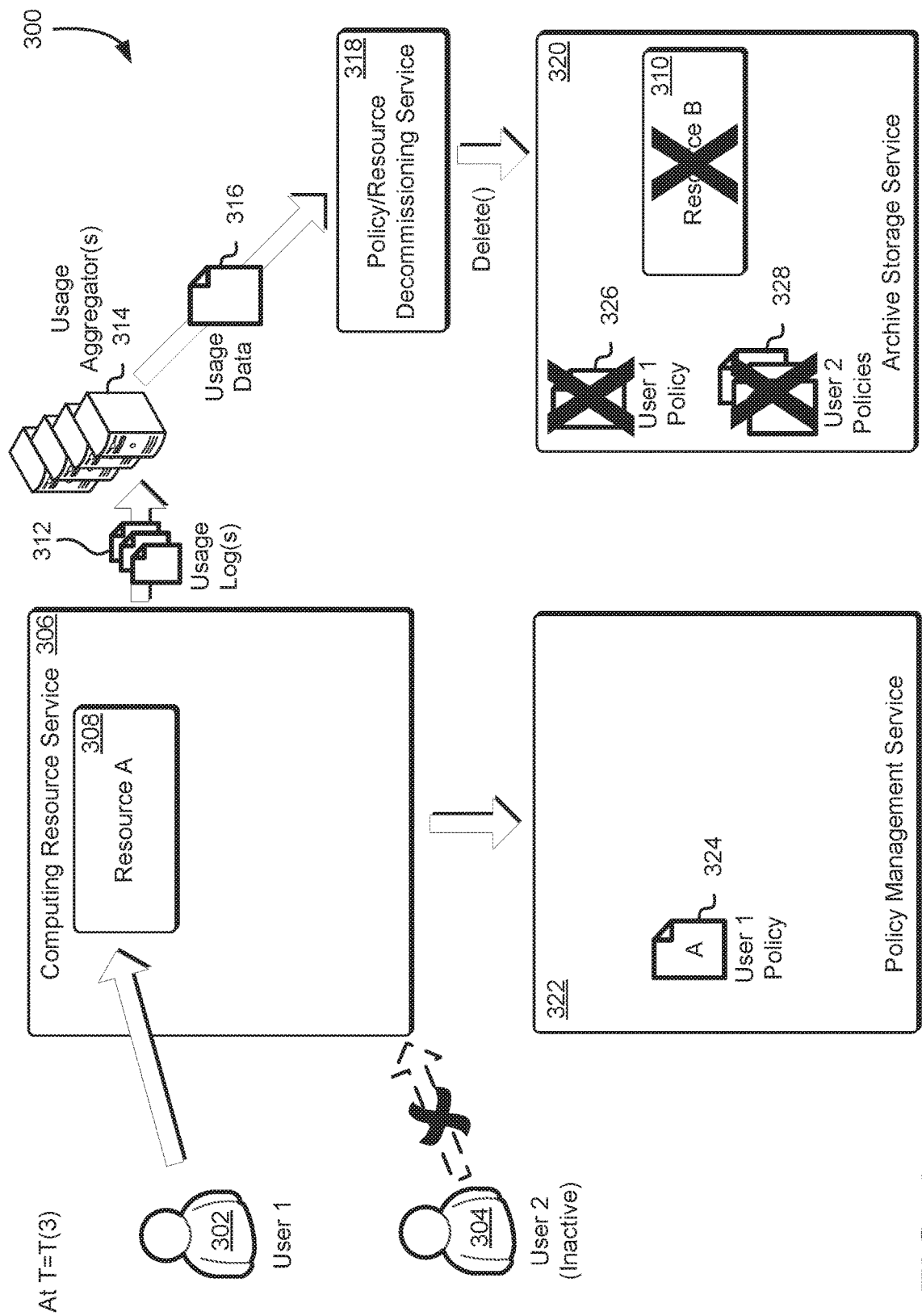
FIG. 3 shows an illustrative example of an environment in which unused policies and resources stored within an archive storage service are deleted based at least in part on a determination that a third threshold has been reached for the unused policies and resources in accordance with at least one embodiment.

FIG. 3 shows an illustrative example of an environment 300 in which unused policies and resources stored within an archive storage service 320 are deleted based at least in part on a determination that a third threshold has been reached for the unused policies and resources in accordance with at least one embodiment. The environment 300 may be similar to the environment described above in connection with FIG. 2 and may represent a continuation to the process described above. For instance, the policy/resource decommissioning service 318 may receive one or more usage data records 316 from the one or more usage aggregators 314. The usage aggregators 314 may obtain data usage logs 312 from the computing resource service 306 and compile the data from these data usage logs 312 to generate the one or more usage data records 316.

The policy/resource decommissioning service 318 may evaluate the usage data records 316 obtained from the usage aggregators 314 to determine whether any computing resources or policies have been inactive for a period of time greater than a third period of time threshold, as defined in the configuration file provided by the customer or in the default decommissioning configuration of the service 318. The third period of time threshold may represent the expiration period for any inactive computing resources and policies such that if a computing resource or policy has been inactive for a period of time that exceeds this expiration period, the policy/resource decommissioning service 318 may permanently delete the computing resource or policy. It should be noted that while deletion of computing resources and policies that have been inactive for a period of time greater than the third period of time threshold, additional and/or alternative actions may be performed by the policy/resource decommissioning service 318. For instance, a customer or other administrator may specify, through the configuration file provided to the policy/resource decommissioning service 318, that any computing resource or policy that has been inactive for a period of time that exceeds this third period of time threshold is to be transmitted to the customer or other administrator in addition to being deleted from the computing resource service provider environment. It should also be noted that while three period of time thresholds are described extensively throughout the present disclosure, a customer or other administrator may define, through the configuration file, additional or fewer period of time thresholds with corresponding actions to be performed.

If the policy/resource decommissioning service 318 determines that a computing resource or policy has been inactive for a period of time greater than the third period of time threshold, the policy/resource decommissioning service 318 may determine whether the computing resource or policy is archived within the archive storage service 320 or locally within its corresponding service (e.g., computing resource service 306, policy management service 322, etc.). For instance, if the inactive computing resource or policy is stored within an archive storage service 320, the policy/resource decommissioning service 318 may transmit a request, such as an application programming interface (API) call, to the archive storage service 320 to delete the inactive computing resource or policy. In response to the request from the policy/resource decommissioning service 318, the archive storage service 320 may permanently delete the inactive computing resource or policy. Alternatively, if the inactive computing resource or policy has been archived within its corresponding service, the policy/resource decommissioning service 318 may transmit a request to the corresponding service to delete the computing resource or policy. For instance, if the computing resource service 306 has archived an inactive computing resource locally (e.g., using one or more storage devices of the computing resource service 306), the policy/resource decommissioning service 318 may transmit a request to the computing resource service 306 to delete the computing resource from these one or more storage devices.

As an illustrative example, FIG. 3 represents a continuation of the process described above in connection with FIG. 2. For instance, as described above, the policy/resource decommissioning service 318 may have previously caused the computing resource service 306 to transfer computing resource 310 from the computing resource service 306 to an archive storage service 320 in response to a determination that the inactivity period for the computing resource 310 was greater than a second period of time threshold as defined in the configuration file provided by a customer or other administrator of the computing resource 310. If the policy/resource decommissioning service 318 determines, based at least in part on data specified in the usage data records 316, that the computing resource 310 has been inactive for a period of time greater than the third period of time threshold, the policy/resource decommissioning service 318 may determine the location where the computing resource 310 is archived. For instance, the policy/resource decommissioning service 318 may maintain a database that is used to track the location of computing resources and policies over time. In the environment 300, the policy/resource decommissioning service 318 may transmit a request, such as an API call, to the archive storage service 320 to delete the computing resource 310 identified as having been inactive for a period of time greater than the third period of time threshold. In response to the request, the archive storage service 320 may permanently delete the computing resource 310.

Continuing with the illustrative example described above in connection with FIG. 2 and illustrated in FIG. 3, the policy/resource decommissioning service 318 may further determine that the user policy 326 corresponding to user 302 permissions for accessing computing resource 310 and the user policies 328 for inactive user 304 have been inactive for a period of time greater than the third period of time threshold. The policy/resource decommissioning service 318 may evaluate its database to determine where the inactive policies are archived. In response to a determination of where the inactive policies are archived, the policy/resource decommissioning service 318 may transmit a request to the archive storage service 320 to permanently delete the user policy 326 and the user policies 328, as these policies have been inactive for a period of time greater than the third period of time threshold. The policy/resource decommissioning service 318 may transmit a notification to the customer or other administrator of the customer's computing resources to indicate that the inactive computing resource 310 and the inactive policies 326, 328 have been permanently deleted.

If user 302 submits a request to access computing resource 310, the computing resource service 306 may be unable to identify the computing resource 310 or a corresponding user policy from the policy management service 322. Thus, the computing resource service 306 may deny the request from user 302. However, since the policy management service 322 may still maintain a user policy 324 defining user 302 access permissions for computing resource 308, requests from user 302 to access computing resource 308 can be fulfilled. As the user 302 continues to interact with the computing resource 308, the computing resource service 306 may generate and provide data usage logs 312 to the usage aggregators 314. However, if user 304 transmits a request to the computing resource service 306 to access one or more computing resources, the computing resource service 306 may not be able to identify any policies that may be applicable to the request. Accordingly, the computing resource service 306 may deny the request from user 304. Additionally, in some instances, if the user 304 has not utilized its set of credentials to access the computing resource service 306 or other services provided by the computing resource service provider, the policy/resource decommissioning service 318 may also retire the user's credentials subject to the thresholds described above. Thus, if the user's credentials have not be used over a period of time that is greater than the third period of time threshold, the policy/resource decommissioning service 318 may cause the user's credentials to be permanently deleted. Thus, the computing resource service 306 may no longer be able to recognize the credentials provided by user 304 and thus may not be able to authenticate user 304.

Figure 4:
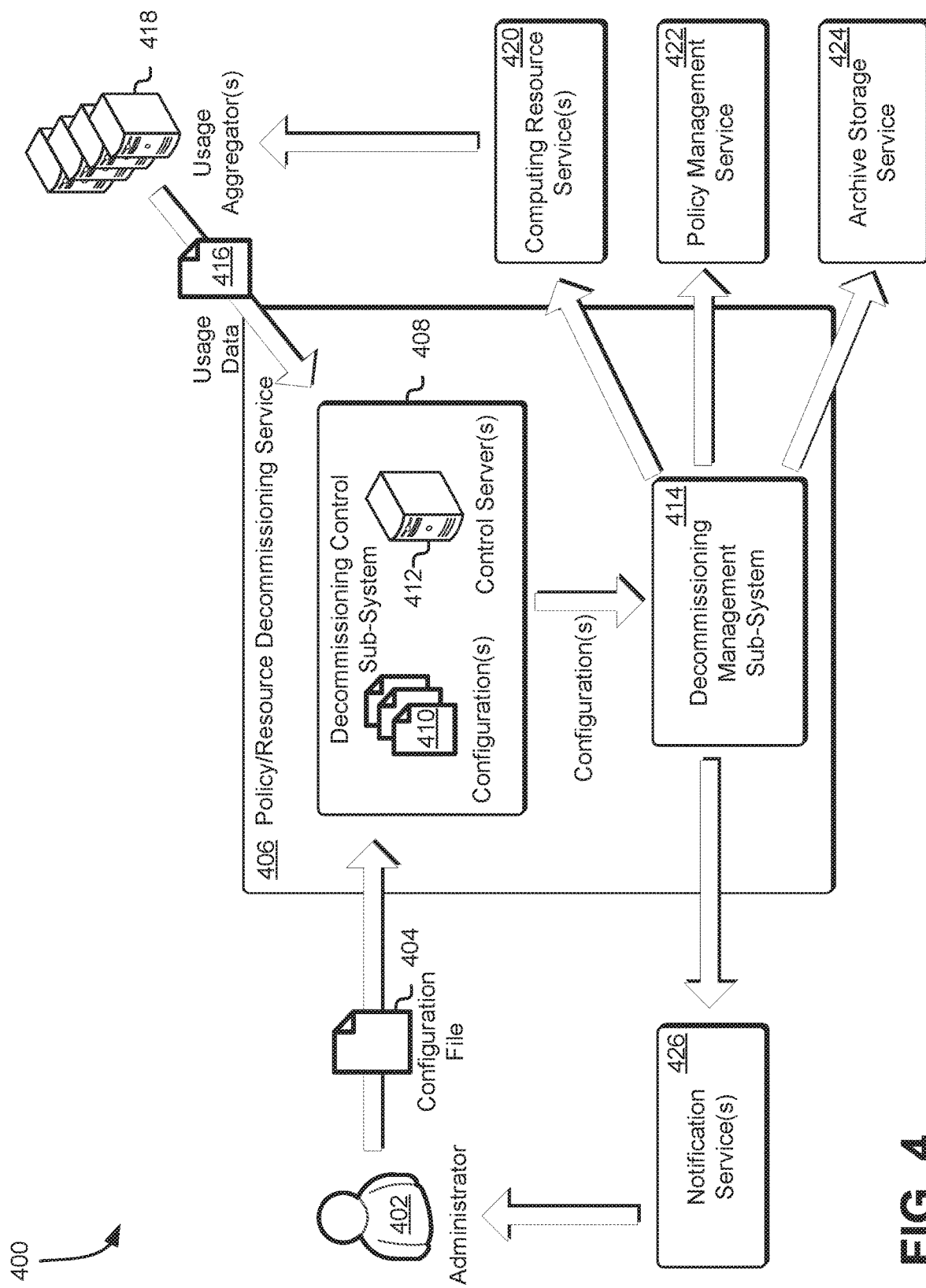
FIG. 4 shows an illustrative example of an environment in which a policy/resource decommissioning service utilizes usage data to identify periods of inactivity for resources and policies to determine whether a threshold has been met for performing remedial actions in accordance with at least one embodiment.

As noted above, a customer or other administrator of a customer's account may transmit a request to a policy/resource decommissioning service to monitor and retire one or more computing resources and policies according to various thresholds. The customer or other administrator may provide a configuration file that may specify the various thresholds and the actions to be performed if a computing resource or policy has been inactive for a period of time greater than any of the period of time thresholds specified in the configuration file. Accordingly, FIG. 4 shows an illustrative example of an environment 400 in which a policy/resource decommissioning service 406 utilizes usage data to identify periods of inactivity for resources and policies to determine whether a threshold has been met for performing remedial actions in accordance with at least one embodiment.

In the environment 400, an administrator 402 of a customer account transmits a request to a policy/resource decommissioning service 406 to monitor one or more computing resources associated with the account and policies associated with these one or more computing resources to determine whether to initiate decommissioning of these computing resources and policies. The administrator 402, through the request, may provide a configuration file 404 specifying various parameters for the monitoring and decommissioning of the one or more computing resources and policies. For instance, as described in greater detail below in connection with FIG. 5, the configuration file 404 may specify one or more thresholds for inactivity. For instance, the administrator 402 may define a period of time that is to serve as a threshold that, if exceeded, causes the policy/resource decommissioning service 406 to perform one or more actions. These actions may also be defined through the configuration file 404 or may be defined, by default, by the policy/resource decommissioning service 406. Through the configuration file 404, the administrator 402 may also specify the computing resources, policies, and other security elements that are to be monitored by the policy/resource decommissioning service 406.

Additionally, the administrator 402 may specify, through the configuration file 404, notification settings that may be used by the policy/resource decommissioning service 406 to notify the administrator 402 regarding any actions performed by the policy/resource decommissioning service 406 in response to a determination that a period of inactivity for a computing resource, policy, or other security element is greater than any of the specified period of time thresholds. For instance, if the policy/resource decommissioning service 406 disables one or more policies or prevents further access to a computing resource based at least in part on a detected period of inactivity for these one or more policies or the computing resource, the policy/resource decommissioning service 406 transmit a notification indicating the actions performed to one or more notification services 426. The one or more notification services 426 may enable the policy/resource decommissioning service 406 to send notifications to large numbers of recipients or other distributed networks and receive notifications through a communications network. The policy/resource decommissioning service 406 may publish the notification through a particular topic created using the one or more notification services 426. In response to the policy/resource decommissioning service 406 publishing the notification to the topic, the notification may be transmitted to each recipient subscribed to the topic. The policy/resource decommissioning service 406 may add the notification generated in response to performance of one or more actions in response to detection of a period of inactivity for a computing resource or policy that exceeds a defined threshold to this topic, which may cause the one or more notification services 426 to transmit the notification to the administrator 402, a computing resource monitoring service, and other recipients which may be subscribed to this particular topic.

In response to the request from the administrator 402 to monitor one or more computing resources and policies for potential decommissioning, the policy/resource decommissioning service 406 may store the configuration file 404 within a configuration file repository 410. The configuration file repository 410 may be maintained through a decommissioning control sub-system 408, which may comprise one or more computer systems that may process configuration files obtained from various administrators and customers. Further, these one or more computer systems may include one or more control servers 412 that may process incoming usage data records 416 from usage aggregators 418 associated with the one or more computing resource services 420 made available by the computing resource service provider. The one or more control servers 412 may parse the incoming usage data records 416 to identify current inactivity periods for each of the myriad computing resources of the computing resource services 420, policies associated with these computing resources, and other security elements such as user credentials, principals, user groups, and the like.

The decommissioning control sub-system 408, based at least in part on the configuration files 410 available for applicable computing resources, policies, and other security elements and on the data obtained from the usage data records 416, may transmit configuration information and usage data to a decommissioning management sub-system 414. The decommissioning management sub-system 414 may comprise one or more computer systems that process usage data from various computing resources, policies, and security elements and determine, based at least in part on configuration information obtained from the decommissioning control sub-system 408, the actions to be performed. For instance, based at least in part on the thresholds specified in the configuration information and the actions either specified in the configuration information or defined by default, the decommissioning management sub-system 414 may interact with the one or more computing resource services 420, the policy management service 422, and/or archive storage service 424 to perform these actions.

As an illustrative example, if the decommissioning management sub-system 414 determines that a computing resource has been inactive for a period of time greater than a first period of time threshold specified in the configuration information obtained from the decommissioning control sub-system 408, the decommissioning management sub-system 414 may access the policy management service 422 to modify one or more existing policies associated with the computing resource. These modified policies may be used to deny all access to the inactive computing resource. Alternatively, the decommissioning management sub-system 414 may generate a new policy that supersedes any existing policies associated with the inactive computing resource to deny any access to the computing resource. The decommissioning management sub-system 414 may generate and transmit a notification to the one or more notification services 426 to indicate that these actions have been performed. The decommissioning management sub-system 414 may identify the administrator 402 associated with the affected computing resource and ensure that the notification is added to the topic to which the administrator 402 is subscribed.

If a computing resource, policy, or other security element has been inactive for a period of time greater than a second period of time threshold, the decommissioning management sub-system 414 may evaluate the configuration information from the decommissioning control sub-system 408 to determine whether the computing resource, policy, or other security element is to be archived within an archive storage service 424 or locally within its corresponding service (e.g., computing resource service 420, policy management service 422, etc.). If the configuration information specifies that the inactive computing resource, policy, or other security element is to be archived within the archive storage service 424, the decommissioning management sub-system 414 may transmit a request to the corresponding service where the inactive computing resource, policy, or other security element is maintained to transfer it to the archive storage service 424 for archival storage. For example, if the decommissioning management sub-system 414 determines that a computing resource has been inactive for a period of time greater than the second period of time threshold specified in the configuration information, the decommissioning management sub-system 414 may transmit a request to the computing resource service 420 responsible for maintaining the computing resource to transfer the computing resource to the archive storage service 424. Further, the decommissioning management sub-system 414 may transmit a request to the policy management service 422 to transfer any policies associated with the inactive computing resource to the archive storage service 424.

Based at least in part on the configuration information and the usage data obtained from the decommissioning control sub-system 408, the decommissioning management sub-system 414 may further determine if any computing resources, policies, or security elements have been inactive for a period of time that exceeds a third period of time threshold. If this third period of time threshold is exceeded, the decommissioning management sub-system 414 may access a database maintained by the decommissioning control sub-system 408 to determine the location of where the inactive computing resource, policy, or security element has been archived or is otherwise being maintained. The decommissioning control sub-system 408 may transmit a request to the service where the inactive computing resource, policy, or security element has been archived or is otherwise being maintained to cause the inactive computing resource, policy, or security element to be deleted. For instance, if a computing resource has been archived within the archive storage service 424, the decommissioning management sub-system 414 may transmit a request to the archive storage service 424 to permanently delete the inactive computing resource.

Figure 5:
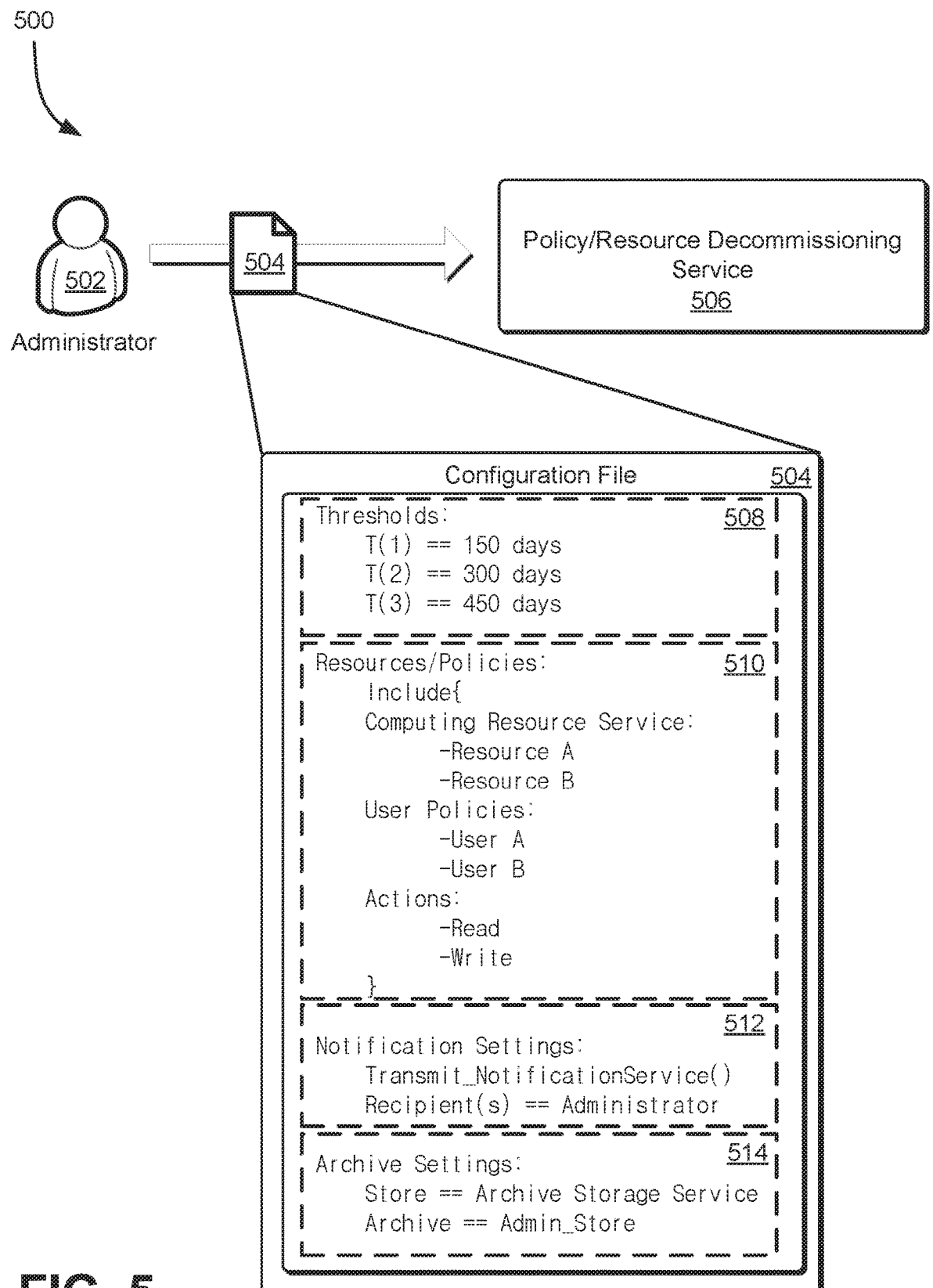
FIG. 5 shows an illustrative example of an environment in which an administrator provides a configuration file for management of policies and resources in accordance with at least one embodiment.

As noted above, an administrator of a customer account can transmit a request to the policy/resource decommissioning service to monitor its computing resources, policies, and other security elements to identify if any of these are inactive and, if so, perform one or more operations. The administrator may provide, within the request, a configuration file that may be used to specify various parameters for the monitoring and performance of remedial actions to progressively retire inactive computing resources, policies, and other security elements. Accordingly, FIG. 5 shows an illustrative example of an environment 500 in which an administrator 502 provides a configuration file 504 for management of policies and resources in accordance with at least one embodiment. The administrator 502 may provide the configuration file 504 to the policy/resource decommissioning service 506 in a request to initiate monitoring of the computing resources, policies, and security elements associated with a customer's account or at any time after the policy/resource decommissioning service 506 has begun monitoring the computing resources, policies, and security elements associated with the customer's account.

The configuration file 504 may comprise various fields that may be utilized to define how the policy/resource decommissioning service 506 is to monitor specific computing resources, policies, and security elements. Further, these various fields may be used to identify the actions to be performed by the policy/resource decommissioning service 506 in the event that a computing resource, policy, or security element has been inactive for a period of time greater than any of the defined period of time thresholds. It should be noted that an administrator 502 may not be required to provide a configuration file 504 for the monitoring of the computing resources, policies, and security elements associated with a customer's account. For instance, the policy/resource decommissioning service 506 may be subject to a default decommissioning configuration defined by an administrator of the policy/resource decommissioning service 506 or the computing resource service provider. This default decommissioning configuration may specify the various period of time thresholds, notification settings, archival settings, actions to be performed, and the like.

The configuration file 504 may include a thresholds field 508, which the administrator 502 may use to define the one or more period of time thresholds that are to be used to determine actions to be performed in response to detection of inactivity for computing resources, policies, and security elements as defined by the administrator 502. Each threshold defined in the thresholds field 508 may correspond to one or more actions that the administrator 502 may define through the configuration file 504 or may be defined by the policy/resource decommissioning service 506 by default. For instance, the policy/resource decommissioning service 506 may require that an administrator 502, in the configuration file 504, define at least three distinct period of time thresholds in the thresholds field 508. If the administrator 502 does not define corresponding actions to be performed in connection with each of these period of time thresholds, the policy/resource decommissioning service 506 may perform certain actions for each threshold. For example, if a computing resource is inactive for a period of time that exceeds the first period of time threshold (e.g., T(1)), the policy/resource decommissioning service 506 may modify one or more user policies associated with the computing resource to deny access to the computing resource. Alternatively, if a policy has been inactive for a period of time that exceeds this first period of time threshold, the policy/resource decommissioning service 506 may disable the policy. Other actions that may be performed by the policy/resource decommissioning service 506 based at least in part on the defined thresholds are described in greater detail below.

In addition to the thresholds field 508, the configuration file 504 may include a resources/policies field 510, which the administrator 502 may use to define which computing resources, policies, and security elements are to be monitored by the policy/resource decommissioning service 506. Through the resources/policies field 510 the administrator 502 may define an include list or ordering of computing resources, policies, actions and security elements that are to be monitored. For instance, as illustrated in FIG. 5, the administrator 502 has specified that Resource A, Resource B, user policies associated with User A and User B, and any read and write actions from users are to be monitored by the policy/resource decommissioning service 506. In an alternative embodiment, the administrator 502 can define an exclude list or ordering of computing resources, policies, actions and security elements. If the administrator 502 defines such an exclude list, the policy/resource decommissioning service 502 may monitor all computing resources, policies, actions and security elements associated with the customer's account except for those identified in the configuration file 504.

The configuration file 504 may further include a notification settings field 512, which the administrator 502 may use to define how the policy/resource decommissioning service 506 is to notify the administrator 502 in the event that the policy/resource decommissioning service 506 performs one or more actions on the identified computing resources, policies, or security elements. For instance, an administrator 502 may specify that the policy/resource decommissioning service 506 is to transmit a notification to one or more notification services, where the notification can be added to a topic to which the administrator 502 is subscribed. Alternatively, the administrator 502 may specify a phone number, electronic mail address, a physical mailing address, a username associated with a different service (e.g., chat room services, instant messaging services, etc.), and the like.

The configuration file 504 may also include an archive settings field 514, which the administrator 502 may use to define whether the policy/resource decommissioning service 506 is to archive inactive computing resources, policies, and security elements within their corresponding services, within an archive storage service as described above, or through an alternative method. Through the archive settings field 514, the administrator 502 may specify which storage devices are to be utilized within the archive storage service if the administrator 502 or customer has previously provisioned one or more storage devices from the archive storage service for its use. Alternatively, if the administrator 502 does not specify a specific set of storage devices from the archive storage service, the policy/resource decommissioning service 506 may automatically provision the necessary resources from the archive storage service to support these settings. If the administrator 502 specifies that inactive computing resources, policies, and security elements are to be archived using an alternative method, the administrator 502 may specify in the archive settings field 514 information necessary for the policy/resource decommissioning service 506 to perform the archival process. This may include Internet Protocol (IP) addresses, Domain Name System (DNS) hostnames, and the like.

It should be noted that the configuration file 504 may include additional, fewer, or alternative fields. For instance, the administrator 502 may generate an actions field within the configuration file 504 to specify what actions are to be performed by the policy/resource decommissioning service 506 if a threshold is passed. Thus, instead of performing one or more actions defined in the default decommissioning configuration of the policy/resource decommissioning service 506, the policy/resource decommissioning service 506 may perform the actions specified in the configuration file 504. If the configuration file 504 does not include some of the fields as illustrated in FIG. 5, the policy/resource decommissioning service 506 may utilize the default decommissioning configuration of the policy/resource decommissioning service 506 to substitute any missing parameters. For instance, if the configuration file 504 does not include the thresholds field 508, the policy/resource decommissioning service 506 may use the default decommissioning configuration to define the period of time thresholds to be used for monitoring the administrator 502 defined computing resources, policies, and security elements.

Figure 6:
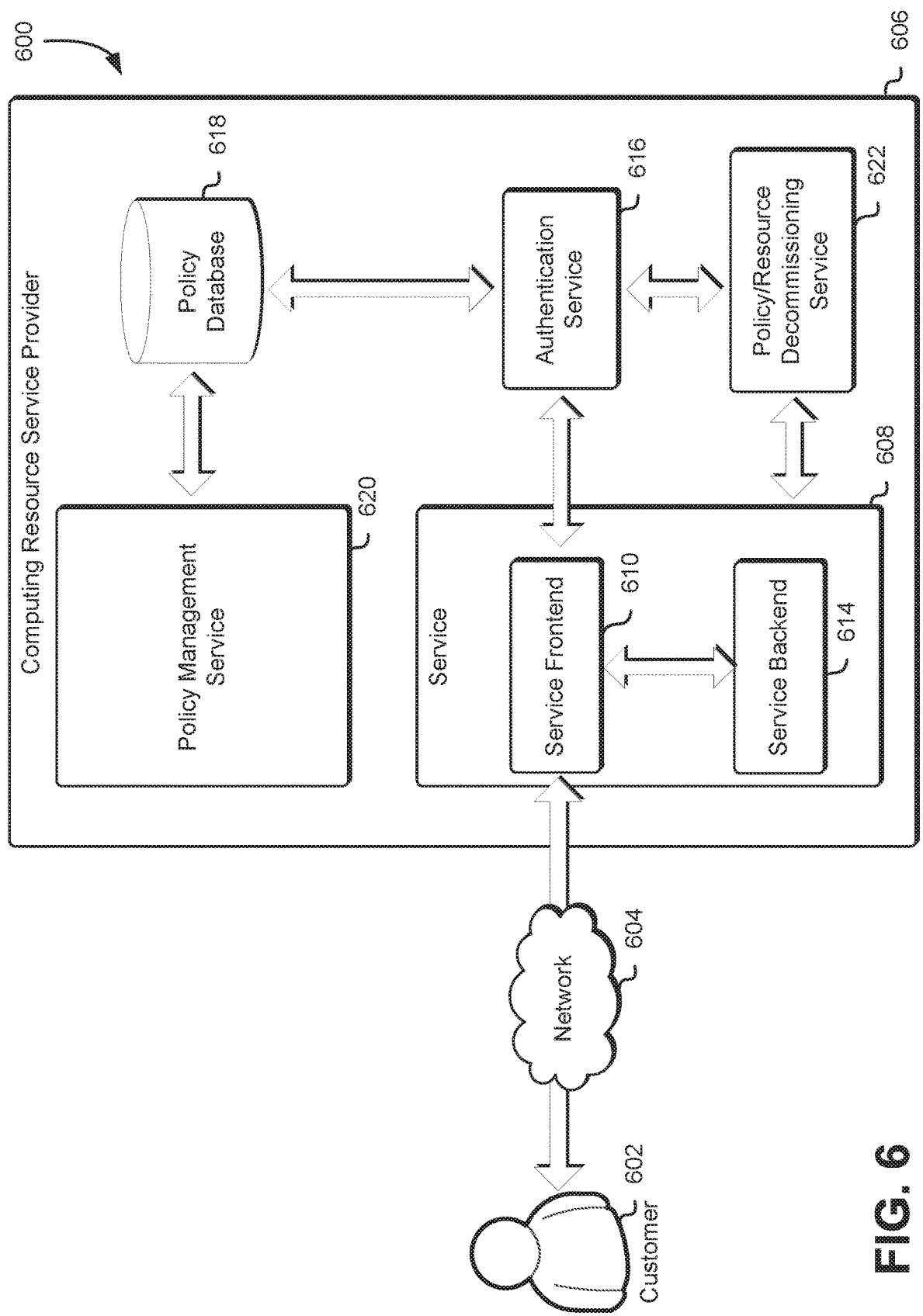
FIG. 6 shows an illustrative example of an environment in which various embodiments can be implemented.

FIG. 6 shows an illustrative example of an environment 600 in which various embodiments can be implemented. In an embodiment, a user 602 may use a computing device to communicate over a network 604 with a computing resource service provider 606. Communications between the computing resource service provider 606 and the user 602 may, for instance, be for the purpose of accessing a service 608 operated by the computing resource service provider 606, which may be one of many services operated by the computing resource service provider 606. The service 608 may comprise a service frontend 610 and a service backend 614. The user 602 may issue a request for access to a service 608 (and/or a request for access to resources associated with the service 608) provided by a computing resource service provider 606. The request may be, for instance, a web service application programming interface request. The user may be an individual, or a group of individuals, or a role associated with a group of individuals, or a process representing one or more of these entities that may be running on one or more remote (relative to the computing resource service provider 606) computer systems, or may be some other such computer system entity, individual, or process. Each individual, group, role, or other such collection of users may have a corresponding user definition, group definition, role definition, or other definition that defines the attributes and/or membership of that collection. For example, a group may be a group of users that have the same geographical location. The definition of that group of users may include the membership of the group, the location, and other data and/or metadata associated with that group. As used herein, a user is an entity corresponding to an identity managed by the computing resource service provider, where the computing resource service provider manages permissions for the identity and where the entity may include one or more sub-entities, which themselves may have identities.

The user 602 may communicate with the computing resource service provider 606 via one or more connections (e.g., transmission control protocol (TCP) connections). The user 602 may use a computer system client device to connect to the computing resource service provider 606. The client device may include any device that is capable of connecting with a computer system via a network, such as example devices discussed below. The network 604 may include, for example, the Internet or another network or combination of networks discussed below.

The computing resource service provider 606, through the service 608, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 608 may be received by a service frontend 610, which, in some examples, comprises a web server configured to receive such requests and to process them according to one or more policies associated with the service 608. The request for access to the service 608 may be a digitally signed request and, as a result, may be provided with a digital signature. The service frontend 610 may then send the request and the digital signature for verification to an authentication service 616. The authentication service 616 may be a stand-alone service or may be part of a service provider or other entity. The authentication service 616, in an embodiment, is a computer system configured to perform operations involved in authentication of users. In some examples, requests submitted to the service frontend 610 are digitally signed by the user 602 (i.e., by a computing device used by or operating on behalf of the principal) using a symmetric cryptographic key that is shared between the user 602 and the authentication service 616. The authentication service, therefore, may use a copy of the symmetric cryptographic key to verify digital signatures of requests purported to have been generated by the user 602. However, in other embodiments, the authentication service 616 can be configured to utilize asymmetric cryptography for digital signature verification such as, for example, in response to the principal digitally signing requests using a private cryptographic key. In such embodiments, the authentication service may be configured to trust a certificate authority that digitally signed a certificate of the user 602 corresponding to the private cryptographic key. Consequently, in some embodiments, the authentication service may use a public cryptographic key specified by the certificate.

If the request is successfully authenticated, the authentication service 616 may then obtain policies applicable to the request. A policy may be applicable to the request by way of being associated with the user 602, a resource to be accessed as part of fulfillment of the request, a group in which the user 602 is a member, a role the user 602 has assumed, and/or otherwise. To obtain policies applicable to the request, the authentication service 616 may transmit a query to a policy database 618 managed by a policy management service 620. The policy management service 620 may also determine the policy version associated with the policy by transmitting a query to the policy database 618.

In an embodiment, a customer of the computing resource service provider 606 may transmit a request to a policy/resource decommissioning service 622 to monitor computing resources, policies, and security elements associated with the customer's account. In response to the customer request to monitor these computing resources, policies, and security elements, the policy/resource decommissioning service 622 may transmit the request for verification to the authentication service 616. If the request is successfully authenticated, the authentication service 616 may obtain policies applicable to the customer request, which the policy/resource decommissioning service 622 may use to determine whether the customer is authorized to have its computing resources, policies, and security elements monitors and made subject to decommissioning. If the policy/resource decommissioning service 622 determines that the customer is authorized, the policy/resource decommissioning service 622 may determine, based at least in part on the customer request, configuration information for the monitoring and decommissioning of the customer's computing resources, policies, and security elements. For instance, a customer, through the request, may provide a configuration file that specifies the one or more period of time thresholds, the computing resources, policies, and security elements to be monitored and potentially retired, the actions to be performed if a period of inactivity exceeds a period of time threshold, notification settings, archival settings, and the like. Alternatively, if the customer does not provide a configuration file, the policy/resource decommissioning service 622 may utilize a default decommissioning configuration of the policy/resource decommissioning service 622.

In response to the customer request to monitor its computing resources, policies, and security elements, the policy/resource decommissioning service 622 may configure one or more usage aggregators to obtain usage data records from the service 608, the policy management service 620, and any other services that are used to maintain the identified computing resources, policies, and security elements. The policy/resource decommissioning service 622 may utilize the usage data records to determine whether any computing resources, policies, or security elements have been inactive for a period of time greater than any of the thresholds defined in the configuration file provided by the customer 602 or in the default decommissioning configuration of the policy/resource decommissioning service 622. For instance, if a computing resource has been inactive for a period of time greater than a first (e.g., earliest) period of time threshold, the policy/resource decommissioning service 622 may transmit a request to the policy management service 620 to identify one or more policies associated with the computing resource. The policy/resource decommissioning service 622 may access the policy database 618 to obtain the identified policies and may modify these policies such that any future requests to access the inactive computing resources are denied. In some embodiments, the policy/resource decommissioning service transmits a request to the policy management service 620 to generate a new policy that, if applied, would cause any requests to access the inactive computing resource to be denied. This new policy would supersede any existing policies associated with the inactive computing resource.

If a computing resource, policy, or other security element has been inactive for a period of time greater than a second period of time threshold, the policy/resource decommissioning service 622 may determine whether the computing resource, policy, or other security element is to be archived (locally within its corresponding service, at an archive storage service, or other location) or permanently deleted. For example, if the policy/resource decommissioning service 622 determines that a computing resource has been inactive for a period of time greater than the second period of time threshold, the policy/resource decommissioning service 622 may evaluate the configuration file provided by the customer 602 or, if not provided, the default decommissioning configuration, to determine whether the computing resource is to be archived or deleted. If the policy/resource decommissioning service 622 determines that the computing resource is to be archived locally within the service 608, the policy/resource decommissioning service 622 may transmit a request to the service 608 to transfer the computing resource to one or more storage devices of the service 608 such that the computing resource may no longer be accessible by the customer 602. Alternatively, if the policy/resource decommissioning service 622 determines that the computing resource is to be archived within an archive storage service, the policy/resource decommissioning service 622 may transmit a request to the service 608 to transfer the inactive computing resource to the archive storage service.

The policy/resource decommissioning service 622 may continue to monitor usage data records from the aggregators to determine whether any computing resources, policies, or security elements have been inactive for a period of time greater than a third (e.g., longest) period of time threshold. If the policy/resource decommissioning service 622 determines that a computing resource, policy, or security element has been inactive for a period of time greater than the third period of time threshold, the policy/resource decommissioning service 622 may determine the location of the computing resource, policy, or security element. For instance, if the inactive computing resource, policy, or security element is stored within an archive storage service, the policy/resource decommissioning service 622 may transmit a request to the archive storage service to delete the inactive computing resource, policy, or security element.

At any time prior to reaching this third period of time threshold, the customer 602 may submit a request to the policy/resource decommissioning service 622 to re-activate any computing resource, policy, or security element that has been disabled or archived due to extended periods of inactivity. In response to the request, the policy/resource decommissioning service 622 may transfer the identified computing resource, policy, or other security element from the archive storage service to its corresponding service (e.g., service 608, policy management service 620, etc.). Further, the policy/resource decommissioning service 622 may update any policies modified or disabled as a result of inactivity to enable user access to the restored computing resource, policy, or security element.

Figure 7:
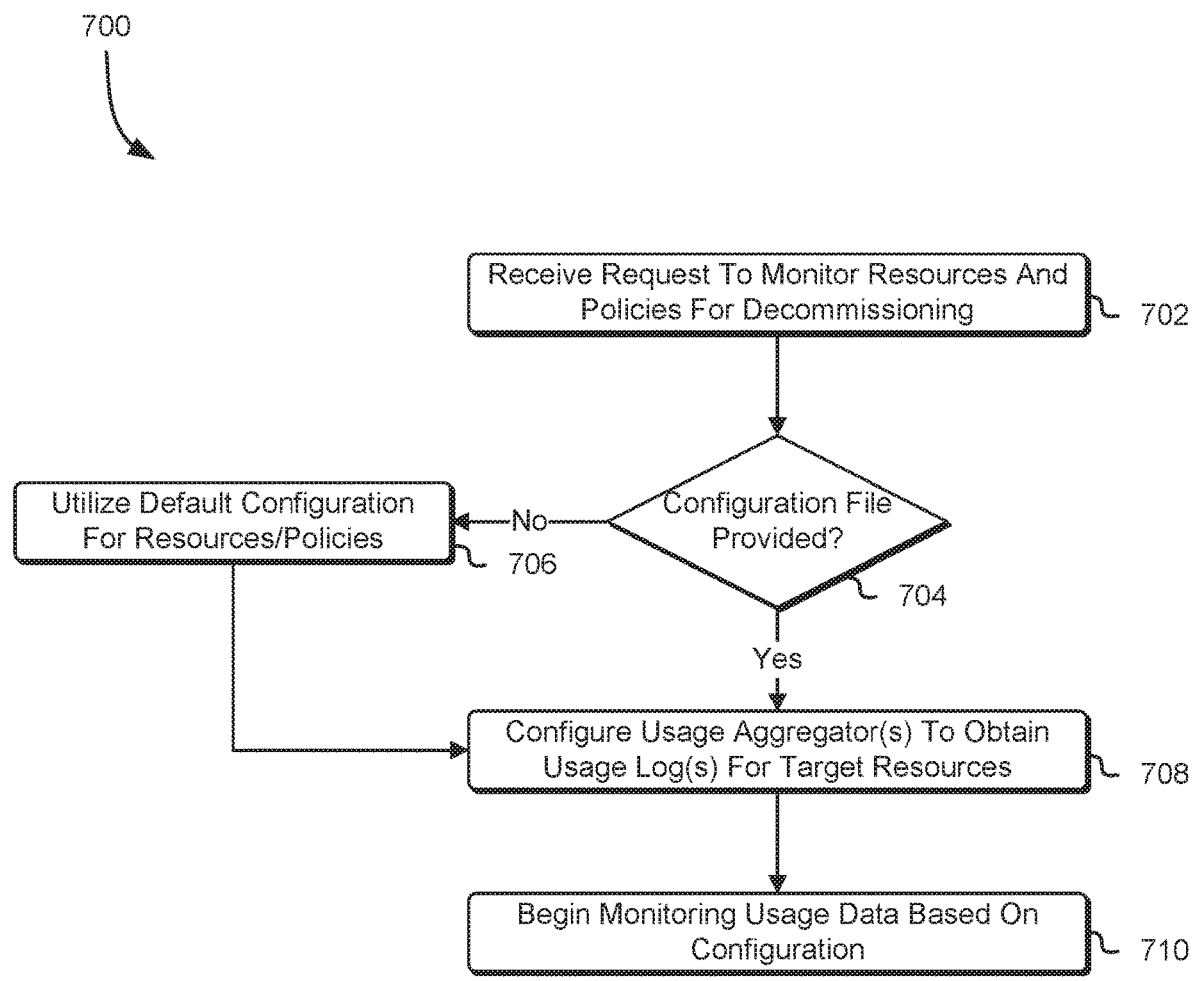
FIG. 7 shows an illustrative example of a process for monitoring usage data for resources and policies based at least in part on a configuration file provided by an administrator in accordance with at least one embodiment.

As noted above, an administrator of a customer account or the customer itself may transmit a request to a policy/resource monitoring service to monitor the customer's computing resources, policies, and security elements for inactivity. Further, the customer may request that these inactive computing resources, policies, and security elements be progressively retired based at least in part on whether their corresponding inactivity periods exceeds any period of time thresholds. The customer or administrator may provide a configuration file defining the resources to be monitored and progressively retired, as well as other parameters that may be used by the service to determine how to progressive retire these inactive resources. Accordingly, FIG. 7 shows an illustrative example of a process 700 for monitoring usage data for resources and policies based at least in part on a configuration file provided by an administrator in accordance with at least one embodiment. The process 700 may be performed by the aforementioned policy/resource decommissioning service, which may obtain a request from the customer to monitor its resources.

In an embodiment, a customer submits a request to the policy/resource decommissioning service to monitor one or more computing resources, user policies, and/or security elements such that if any of these are inactive over an extended period of time, they may be progressively retired from service by the policy/resource decommissioning service. Thus, the policy/resource decommissioning service may receive 702, from the customer or administrator of the customer's account, a request to monitor the customer's resources, policies, and/or security elements for potential decommissioning. The customer, through the request may provide a configuration file specifying the computing resources, policies, and security elements that are to be monitored, the one or more period of time thresholds for inactivity, the actions to be performed if a period of inactive exceeds a period of time threshold, customer notification settings, archival storage settings, and the like. The customer may not be required to provide a configuration file with the request, which may cause the policy/resource decommissioning service to utilize one or more default settings for monitoring and retiring inactive resources.

Based at least in part on the request received from the customer, the policy/resource decommissioning service may determine 704 if the customer or administrator has provided a configuration file. If the customer or administrator has not provided a configuration file for use by the policy/resource decommissioning service, the policy/resource decommissioning service may utilize 706 its own default decommissioning configuration for the customer's computing resources, policies, and security elements. If the customer or administrator has provided its own configuration file or the policy/resource decommissioning service determines that it is to utilize the default decommissioning configuration for the customer's computing resources, policies, and security elements, the policy/resource decommissioning service may configure 708 one or more usage aggregators to obtain data usage logs corresponding to the target resources (e.g., computing resources, policies, and security elements). For instance, based at least in part on the resources identified by the customer or associated with the customer's account as determined by the policy/resource decommissioning service, the policy/resource decommissioning service may identify the one or more services associated with these target resources. The policy/resource decommissioning service may thus configure these usage aggregators to monitor these identified one or more services and obtain the usage data logs for aggregation and delivery to the policy/resource decommissioning service.

The policy/resource decommissioning service may begin 710 monitoring of usage data obtained from the one or more usage aggregators based at least in part on the configuration information specified in the configuration file or in the default decommissioning configuration of the service. For instance, the policy/resource decommissioning service may evaluate the usage data for the target resources to determine whether any target resource has been inactive for a period of time greater than any of the specified period of time thresholds. If so, the policy/resource decommissioning service may perform one or more actions as specified in the configuration file or in the default decommissioning configuration of the service.

Figure 8:
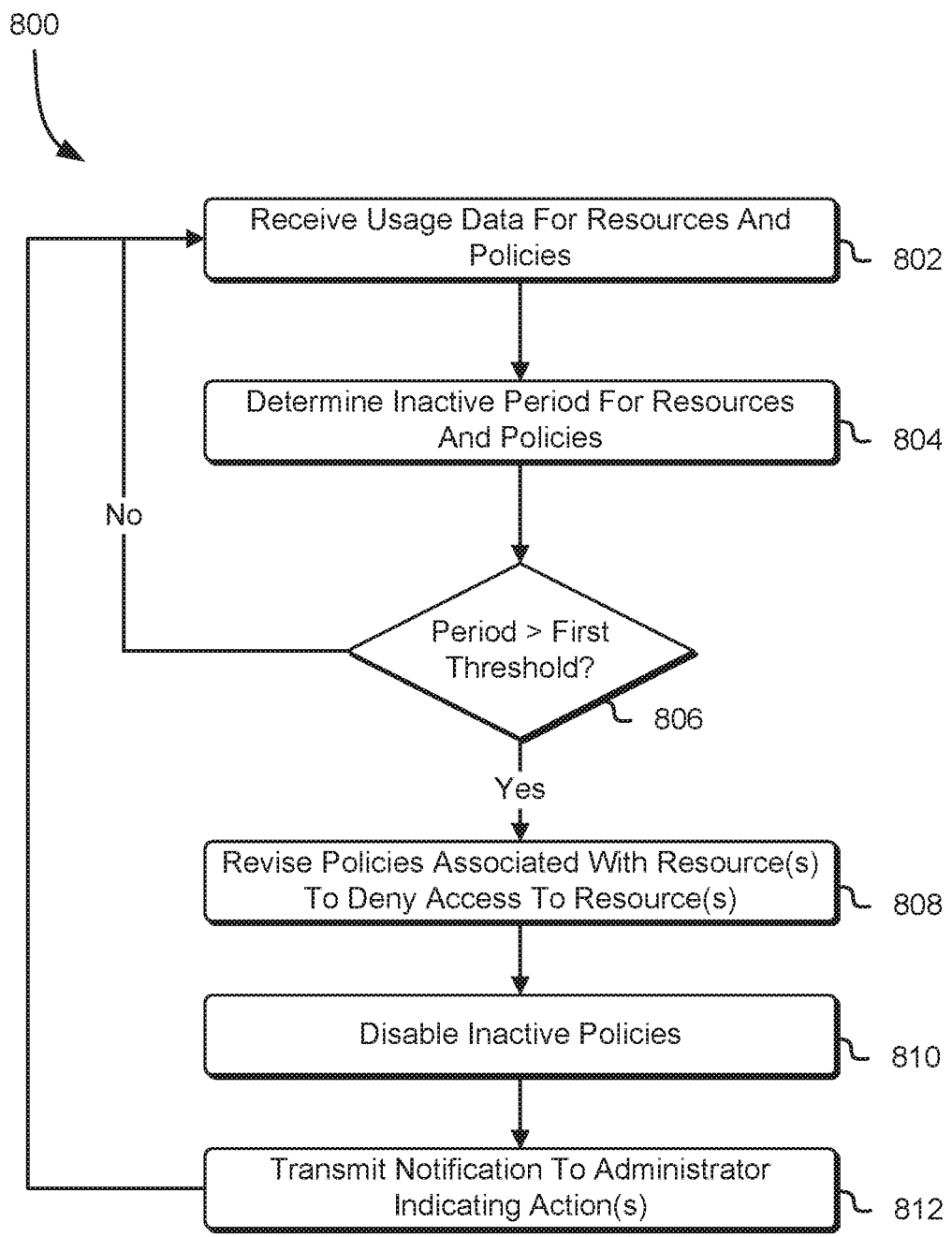
FIG. 8 shows an illustrative example of a process for disabling access to inactive resources and policies in response to a determination that a period of inactivity has surpassed a first threshold in accordance with at least one embodiment.

As noted above, a policy/resource decommissioning service may evaluate usage data associated with one or more target resources to determine whether any of these one or more target resources have been inactive for a period of time greater than a first period of time threshold. This threshold may be defined by a customer or administrator of the customer's account through use of a configuration file provided to the policy/resource decommissioning service or by the default decommissioning configuration of the policy/resource decommissioning service itself. Accordingly, FIG. 8 shows an illustrative example of a process 800 for disabling access to inactive resources and policies in response to a determination that a period of inactivity has surpassed a first threshold in accordance with at least one embodiment. The process 800 may be performed by the aforementioned policy/resource decommissioning service, which may evaluate incoming usage data from the various usage aggregators and perform various actions if any target resource has been inactive for a period of time greater than a first period of time threshold.

As described above in connection with FIG. 7, the policy/resource decommissioning service may configure one or more usage aggregators to obtain usage data logs from services associated with the target resources identified by the customer or administrator of the customer's account. These usage aggregators may organize the obtained usage data logs based at least in part on resource identifier, metric, time, and the like. This data may be aggregated and compiled into one or more usage data records that may be provided to the policy/resource decommissioning service for its use. Thus, the policy/resource decommissioning service may receive 802 usage data for various computing resources, policies, and security elements from these usage aggregators.

The policy/resource decommissioning service may evaluate the received usage data records from the usage aggregators to determine 804 the inactivity period for the computing resources, policies, and security elements identified by the customer for monitoring. Alternatively, if the customer has not specified which target resources are to be monitored, the policy/resource decommissioning service may evaluate each target resource associated with the customer. For instance, each usage data record from the usage aggregators may specify a timestamp for each activity associated with a particular target resource. The policy/resource decommissioning service may identify the last known timestamp for each target resource and compare this timestamp to the current time to determine a period of inactivity for each target resource. Since each usage data record may only include entries for a particular time range, the policy/resource decommissioning service may monitor various usage data records over time and maintain, in a database, the latest observed activity timestamp for each target resource.

Based at least in part on the determined inactivity period for a target resource, the policy/resource decommissioning service may determine 806 whether the inactivity period for the target resource is greater than a first period of time threshold as defined by the customer through a configuration file or through the default decommissioning configuration of the policy/resource decommissioning service. If the inactivity period for the target resource does not exceed the first period of time threshold, the policy/resource decommissioning service may continue to receive 802 usage data records from the usage aggregators and update the inactivity period for the target resource as needed. However, if the inactivity period for the target resource exceeds the first period of time threshold, the policy/resource decommissioning service may identify the one or more policies associated with the target resource. The policy/resource decommissioning service may revise 808 these identified policies associated with the target resource to deny user access to the target resource. For instance, the policy/resource decommissioning service may modify various permissions within these policies to prohibit access to the target resource. In some embodiments, the policy/resource decommissioning service generates a new policy that supersedes any of the existing policies associated with the target resource. This new policy may include one or more statements indicating that all requests for access of the target resource are to be denied.

If the inactive target resource is a policy, the policy/resource decommissioning service may disable 810 the inactive policy. The policy/resource decommissioning service may transmit a request to the policy management service to disable the inactive policy. In response to the request, the policy management service may update a metadata tag associated with the inactive policy to indicate that is has been disabled and should not be made available to any services requesting the policy. Alternatively, the policy management service may quarantine the inactive policy in a separate storage location of the policy management service. Thus, a sub-system of the policy management service that obtains policies in response to requests from users and other services may avoid the separate storage location and not provide the inactive policy.

In response to a determination that the policies associated with the target resource have been revised such that requests to access the target resource are denied, the policy/resource decommissioning service may transmit 812 a notification to the customer or administrator of the customer's account to indicate the actions performed regarding the inactive target resource. For instance, the policy/resource decommissioning service may evaluate the configuration file provided by the customer or other administrator of the customer's account to identify any notification settings specified therein. Based at least in part on these notification settings, the policy/resource decommissioning service may utilize a prescribed method of notification to contact the customer or other administrator of the actions performed. As an example, the policy/resource decommissioning service may transmit a notification to one or more notification services to add the notification to a topic that the customer or other administrator is subscribed to. Thus, the customer or other administrator may access this topic to obtain the notification.

Figure 9:
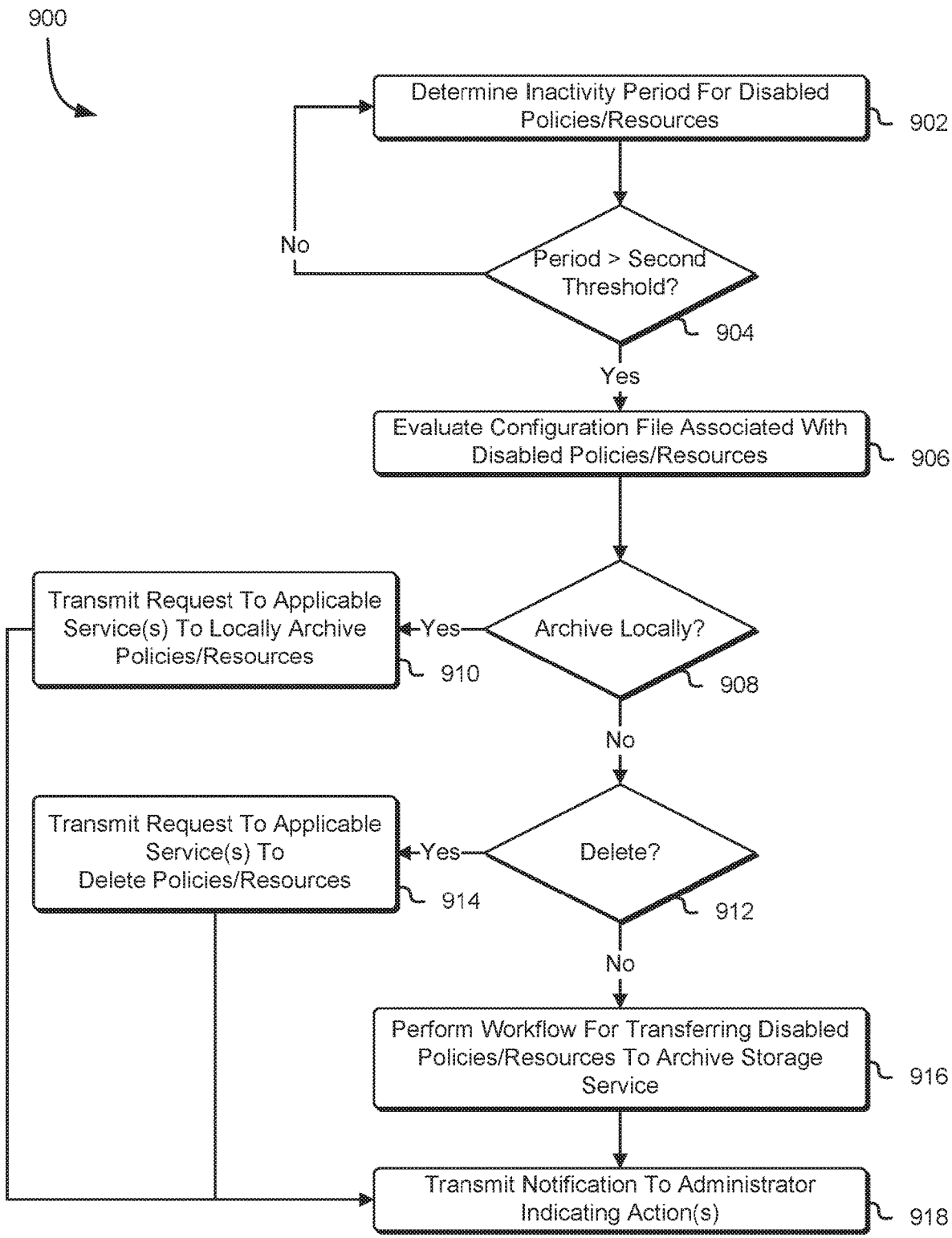
FIG. 9 shows an illustrative example of a process for archiving or deleting inactive resources and policies in response to a determination that a period of inactivity has surpassed a second threshold in accordance with at least one embodiment.

As noted above, a policy/resource decommissioning service may evaluate usage data associated with one or more target resources to determine whether any of these one or more target resources have been inactive for a period of time greater than a second period of time threshold. As with the first period of time threshold, the second period of time threshold may be defined through use of a configuration file provided to the policy/resource decommissioning service or by the default decommissioning configuration of the policy/resource decommissioning service itself. Accordingly, FIG. 9 shows an illustrative example of a process 900 for archiving or deleting inactive resources and policies in response to a determination that a period of inactivity has surpassed a second threshold in accordance with at least one embodiment. The process 900 may be performed by the aforementioned policy/resource decommissioning service.

As with the process described above in connection with FIG. 8, the policy/resource decommissioning service receive usage data for various computing resources, policies, and security elements from the one or more usage aggregators associated with the services used to maintain these computing resources, policies, and security elements. The policy/resource decommissioning service may evaluate the received usage data records from the usage aggregators to determine 902 the inactivity period for the computing resources, policies, and security elements identified by the customer for monitoring. The policy/resource decommissioning service may evaluate the inactivity period for a given target resource to determine 904 whether the inactivity period is greater than a second period of time threshold as defined in the configuration file provided by the customer/administrator or as defined in the default decommissioning configuration of the policy/resource decommissioning service.

If the inactivity period for the target resource is not greater than the second period of time threshold, the policy/resource decommissioning service may continue to process incoming usage data records from the one or more usage aggregators and to determine 902 the inactivity period for any target resources. However, if the policy/resource decommissioning service determines that the inactivity period of a target resource is greater than the second period of time threshold, the policy/resource decommissioning service may evaluate 906 the configuration file associated with the inactive target resource to determine what operations are to be performed. The target resource may have been previously disabled as a result of the policy/resource decommissioning service having modified one or more policies associated with the target resource for being inactive for a greater period of time than the first period of time threshold.

As described above, the configuration file may specify whether the policy/resource decommissioning service is to archive the target resource locally within its corresponding service (e.g., computing resource service, policy management service, etc.) or within an archive storage service. Alternatively, the configuration file may specify that the target resource is to be permanently deleted. The policy/resource decommissioning service may thus determine 908 whether the target resource is to be archived locally within its corresponding service. If, by virtue of the configuration file or the default decommissioning configuration of the policy/resource decommissioning service, the policy/resource decommissioning service determines that the target resource is to be archived locally within its corresponding service, the policy/resource decommissioning service may transmit 910 a request to the applicable service to locally archive the target resource. This may cause the applicable service to store the target resource within one or more separate storage devices allocated for archival purposes or in an archival repository inaccessible by the customer.

If the policy/resource decommissioning service determines that the target resource is not to be archived locally within its corresponding service, the policy/resource decommissioning service may determine 912 whether the target resource is to be deleted permanently. The policy/resource decommissioning service may evaluate the configuration file to determine if the customer or administrator has specified that the target resource is to be deleted. If the policy/resource decommissioning service determines that the target resource is to be deleted, the policy/resource decommissioning service may transmit 914 a request to the applicable service to delete the target resource. This may cause the service used to manage the target resource to permanently delete the target resource.

If the policy/resource decommissioning service determines that that target resource is not to be deleted, the policy/resource decommissioning service may perform 916 a workflow for transferring the target resource from the corresponding service to an archive storage service. The policy/resource decommissioning service may transmit a request to the applicable service where the target resource is maintained to transfer the target resource to the archive storage service. Further, the policy/resource decommissioning service may transmit a request to the archive storage service to provision one or more storage devices for the archival storage of the target resource on behalf of the customer or administrator. In response to a determination that the target resource has been archived or deleted, the policy/resource decommissioning service may transmit 918 a notification to the customer or administrator of the customer's account to indicate the actions performed regarding the inactive target resource.

Figure 10:
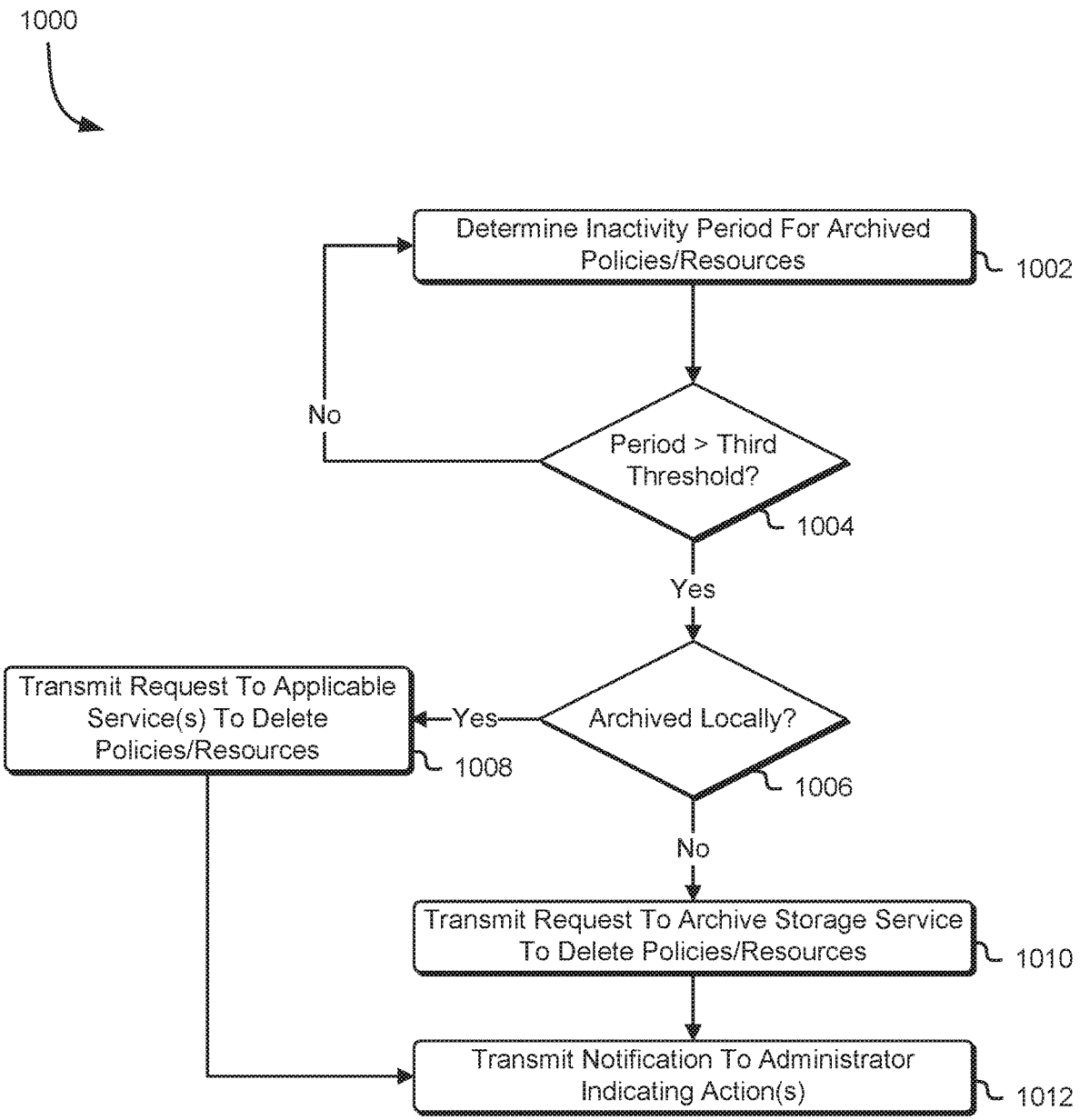
FIG. 10 shows an illustrative example of a process for deleting inactive resources and policies in response to a determination that a period of inactivity has surpassed a third threshold in accordance with at least one embodiment.

As noted above, a policy/resource decommissioning service may evaluate usage data associated with one or more target resources to determine whether any of these one or more target resources have been inactive for a period of time greater than a third period of time threshold. This third period of time threshold, similar to the first and second period of time thresholds described above, may be defined through use of a configuration file provided to the policy/resource decommissioning service or by the default decommissioning configuration of the policy/resource decommissioning service itself. Accordingly, FIG. 10 shows an illustrative example of a process 1000 for deleting inactive resources and policies in response to a determination that a period of inactivity has surpassed a third threshold in accordance with at least one embodiment. The process 1000 may be performed by the aforementioned policy/resource decommissioning service.

Similar to the processes described above in connection with FIGS. 8 and 9, the policy/resource decommissioning service receive usage data for various computing resources, policies, and security elements from the one or more usage aggregators associated with the services used to maintain these computing resources, policies, and security elements. The policy/resource decommissioning service may evaluate the received usage data records from the usage aggregators to determine 1002 the inactivity period for the computing resources, policies, and security elements identified by the customer for monitoring. The policy/resource decommissioning service may evaluate the inactivity period for a given target resource to determine 1004 whether the inactivity period is greater than a third period of time threshold as defined in the configuration file provided by the customer/administrator or as defined in the default decommissioning configuration of the policy/resource decommissioning service. If the inactivity period for the target resource is not greater than the third period of time threshold, the policy/resource decommissioning service may continue evaluating incoming usage data records to determine 1002 the inactivity period for the various computing resources, policies, and security elements selected by the customer or administrator.

If the inactivity period for the target resource is greater than the third period of time threshold as defined in the configuration file or the default decommissioning configuration of the policy/resource decommissioning service, the policy/resource decommissioning service may determine 1006 whether the target resource has been archived locally within its corresponding service. For instance, the policy/resource decommissioning service may maintain a database specifying the location of each archived resource associated with a customer's account. The policy/resource decommissioning service may refer to this database to identify the location of the archived target resource. If the target resource is archived locally within its corresponding service, the policy/resource decommissioning service may transmit 1008 a request to this applicable service to delete the archived target resource. In response to the request, the applicable service may identify the target resource and delete it permanently. However, if the target resource is not archived locally within its corresponding service, the policy/resource decommissioning service may transmit 1010 a request to the archive storage service to delete the target resource.

The archive storage service or the applicable service where the target resource was archived may transmit a notification to the policy/resource decommissioning service to indicate that the target resource has been successfully deleted. In response to this notification, the policy/resource decommissioning service may generate and transmit 1012 a notification to the administrator or customer indicating the one or more actions performed. The policy/resource decommissioning service may evaluate the configuration file provided by the customer or other administrator of the customer's account to identify any notification settings specified therein. Based at least in part on these notification settings, the policy/resource decommissioning service may utilize a prescribed method of notification to contact the customer or other administrator of the actions performed.

Figure 11:
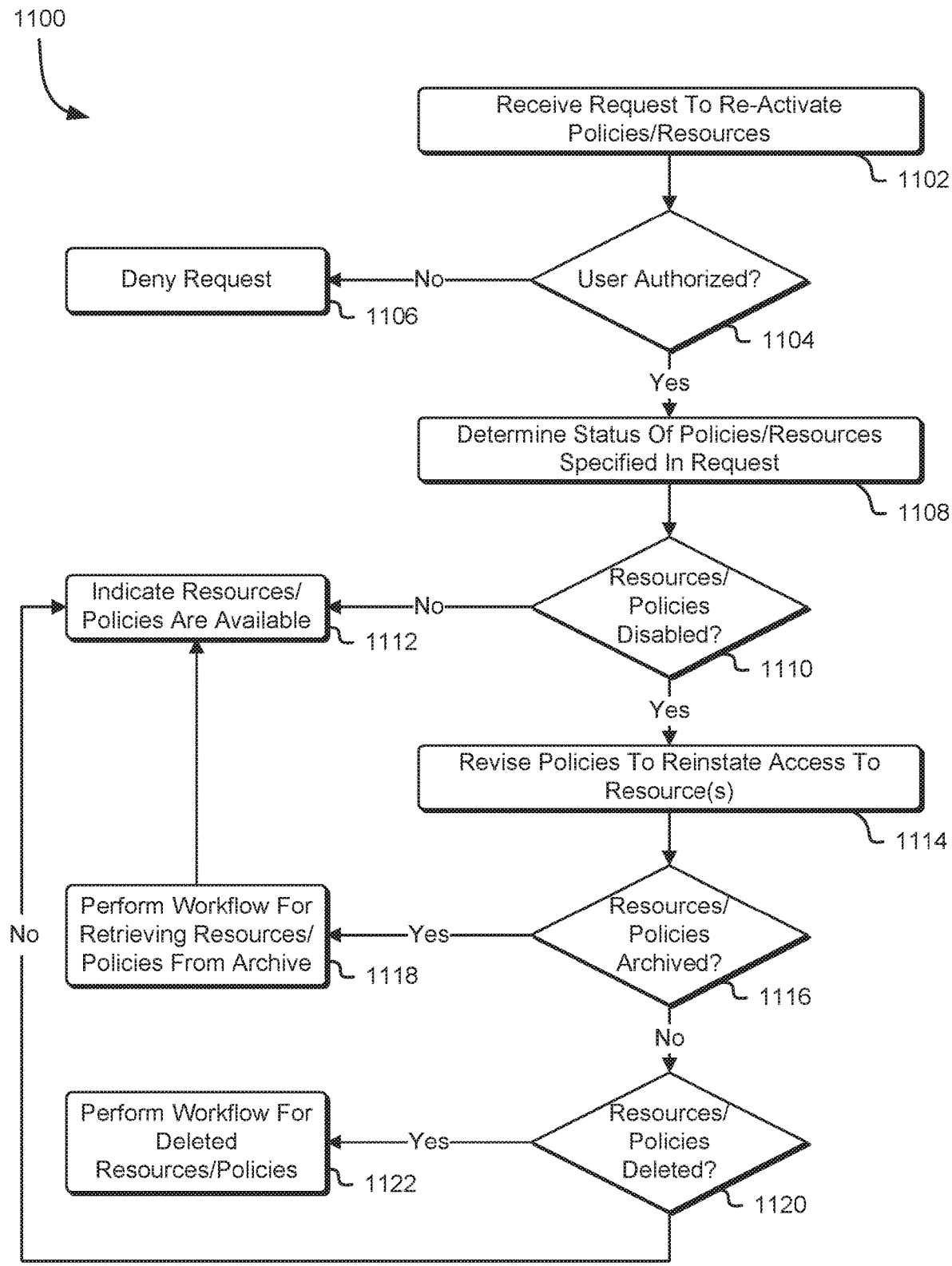
FIG. 11 shows an illustrative example of a process for restoring access to inactive resources and policies in response to a request from an administrator in accordance with at least one embodiment.

If a computing resource, policy, or security element has been disabled by the policy/resource decommissioning service and the computing resource, policy, or security element has not been permanently deleted, the customer or administrator of the customer's account may request that the computing resource, policy, or security element be re-activated for its use. Thus, FIG. 11 shows an illustrative example of a process 1100 for restoring access to inactive resources and policies in response to a request from an administrator in accordance with at least one embodiment. The process 1100 may be performed by the policy/resource decommissioning service in conjunction with any other service where target resources may be archived or stored.

As described above, a customer or administrator may receive notifications from the policy/resource decommissioning service indicating that one or more operations have been performed in response to detection that a target resource has been inactive for a period of time greater than a period of time threshold. The customer or administrator may review these notifications and determine that the target resource should be restored in order to enable continued access to the target resource. Thus, the customer or administrator may transmit a request to the policy/resource decommissioning service to restore the target resource such that the target resource may again be accessible to the customer and other users. The policy/resource decommissioning service may receive 1102 this request to re-activate the target resource and determine 1104 whether the user submitting the request is authorized to re-activate the target resource.

For instance, the policy/resource decommissioning service may obtain one or more policies from a policy database. The policy/resource decommissioning service may utilize these one or more policies to determine whether the user request to re-activate the target resource may be fulfilled. If, based at least in part on these one or more policies, the policy/resource decommissioning service determines that the request cannot be fulfilled because the user is not authorized to re-activate the target resource, the policy/resource decommissioning service may deny 1106 the request. In some embodiments, the policy/resource decommissioning service transmits the request the request to an authentication service to authenticate the request, as described extensively above. If the request cannot be authenticated, the policy/resource decommissioning service may deny 1106 the request.

If the user is authorized to re-activate the target resource, the policy/resource decommissioning service may determine 1108 the status of the target resource specified in the request. The policy/resource decommissioning service may access an internal database that may be utilized to track each computing resource, policy, and security element associated with each customer that requested monitoring of their resources. The policy/resource decommissioning service may thus determine, from this database, the status of the target resource that is to be re-activated in response to the user's request. For instance, through the database, the policy/resource decommissioning service may determine 1110 whether the target resource has been disabled by the policy/resource decommissioning service. If the target resource has not been disabled, the policy/resource decommissioning service may transmit a notification to the user to indicate 1112 that the target resource is available for its use.

However, if the policy/resource decommissioning service determines that the target resource specified by the user has been disabled, the policy/resource decommissioning service may revise 1114 the one or more policies associated with the target resource to reinstate access to the target resource. For instance, the policy/resource decommissioning service may access the policy database to obtain the previously modified policies associated with the target resource. As described above, these policies may have been modified to specify that no users can access the target resource. Thus, the policy/resource decommissioning service may revise these policies to their original state prior to these policies being modified, which may include enabling user access to the target resource. If the target resource is a policy, the policy/resource decommissioning service may transmit a request to the policy management service to request that the policy be no longer disabled.

In addition to revising the applicable policies to reinstate access to the target resource, the policy/resource decommissioning service may determine 1116 whether the target resource has been archived. The policy/resource decommissioning service may review the database to identify if the target resource has been archived and, if so, the location where the target resource has been archived. If the target resource has been archived, the policy/resource decommissioning service may perform 1118 a workflow for retrieving the target resource from its archival location. For instance, if the target resource is archived within an archive storage service, the policy/resource decommissioning service may transmit a request to the archive storage service to transfer the target resource to its original corresponding service. Alternatively, if the target resource is archived locally within its corresponding service, the policy/resource decommissioning service may transmit a request to the corresponding service to restore the target resource for user utilization. If the target resource is restored successfully from archival storage, the policy/resource decommissioning service may indicate 1112 that the target resource is available for use.

If the target resource has not been archived, the policy/resource decommissioning service may determine 1120 whether the target resource has been permanently deleted. To do so, the policy/resource decommissioning service may access its database and determine if there is an entry corresponding to the target resource that indicates that the target resource has been deleted. If the target resource has been deleted, the policy/resource decommissioning service may perform 1122 a workflow for deleted computing resources, policies, and security elements. For instance, the policy/resource decommissioning service may transmit a notification to the user to indicate that the target resource is no longer available. In some embodiments, deletion of the target resource is not permanent if restored within a limited period of time. If the request to re-activate the target resource is obtained within this limited period of time, the policy/resource decommissioning service may restore the target resource. However, if the target resource has not been deleted or the target resource has been restored from a deleted state, the policy/resource decommissioning service may indicate 1112, to the user, that the target resource is now available for its use.

It should be noted that the operations performed as part of process 1100 may be performed in an alternative order than that presented in FIG. 11. For instance, the policy/resource decommissioning service may determine whether the resources and policies specified in the request have been deleted prior to the determination of whether the resources and policies specified in the request have been archived. Thus, if the resources and policies specified in the request have been deleted, the service may perform the workflow for deleted resources and policies without having to determine whether these resources and policies have been archived. However, if the resources and policies specified in the request have not been deleted, the service may determine whether these resources and policies have been archived.

Figure 12:
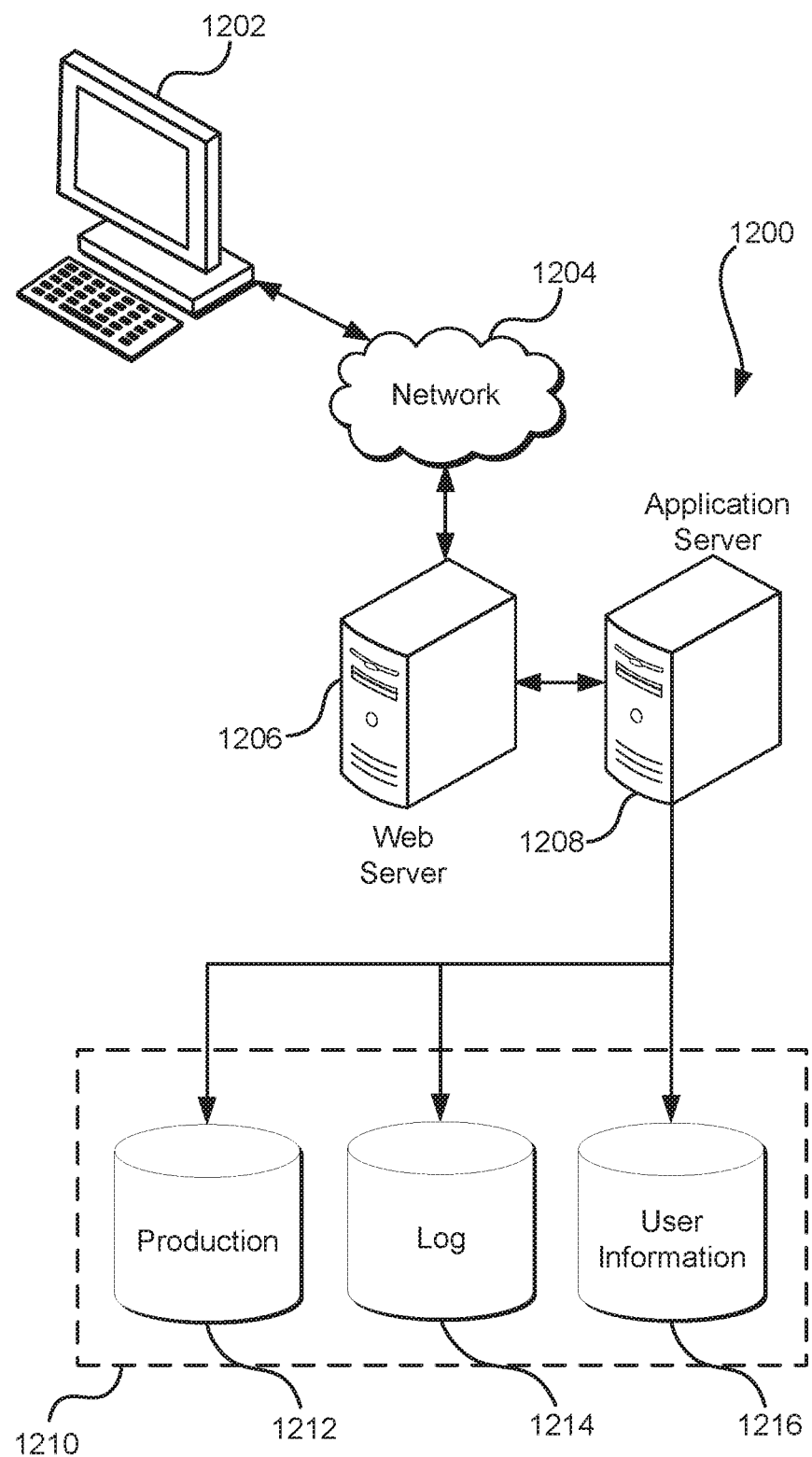
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail.

Communication over the network can be enabled by wired or wireless connections and combinations thereof. In this example, the network includes the Internet and/or other publicly-addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of Hyper-Text Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining a first request to monitor one or more computing resources, the first request specifying a plurality of temporal thresholds for decommissioning of the one or more computing resources;
obtaining, for the one or more computing resources, usage data records specifying activity associated with the one or more computing resources;
determining, for each computing resource of the one or more computing resources, a period of inactivity;
determining, for each computing resource of the one or more computing resources, if the period of inactivity is greater than any temporal threshold of the plurality of temporal thresholds such that:
when the period of inactivity is greater than a first temporal threshold, one or more policies associated with the computing resource are modified to specify a level of access to the computing resource;
when the period of inactivity is greater than a second temporal threshold, whereby the second temporal threshold is greater than the first temporal threshold, the computing resource is archived; and
when the period of inactivity is greater than a third temporal threshold, whereby the third temporal threshold is greater than the first temporal threshold and the second temporal threshold, the computing resource is deleted;
obtaining a second request to re-activate a particular computing resource of the one or more computing resources, the particular computing resource disabled or archived due to the period of inactivity being greater than the second temporal threshold; and
as a result of the particular computing resource being disabled or archived due to the period of inactivity of the particular computing resource being greater than any of the plurality of temporal thresholds, reactivating, upon receipt of the second request, the particular computing resource.

2. The computer-implemented method of claim 1, wherein:
the computer-implemented method further comprises determining a status of the particular computing resource; and
reactivating the particular computing resource includes:
selecting, based at least in part on the status, an operation from a plurality of operations, the operation selected such that:
as a result of the status indicating that one or more policies associated with the particular computing resource were modified to deny access to the particular computing resource, reactivating the particular computing resource by revising the one or more policies associated with the particular computing resource to reinstate access to the particular computing resource; and
as a result of the status indicating that the particular computing resource was archived, reactivating the particular computing resource by transferring the particular computing resource from an archival location to a computer system where the particular computing resource was made available prior to being archived; and
performing the operation.

3. The computer-implemented method of claim 1, wherein the first request includes a configuration file identifying one or more computing resources, one or more archival settings for determining where to archive the one or more computing resources, and one or more notification settings for transmitting notifications if at least one action is performed in response to a determination that the period of inactivity is greater than any of the plurality of temporal thresholds.

4. The computer-implemented method of claim 1, wherein the method further comprises configuring one or more usage aggregators associated with one or more computer systems for the one or more computing resources, such that the one or more usage aggregators obtain usage data from the one or more computer systems and aggregate the usage data to create the usage data records.

5. A system, comprising:
one or more processors; and
memory including instructions that, if executed by the one or more processors, cause the system to:
one or more processors; and
memory including instructions that, when executed by the one or more processors, cause the system to:
obtain a first request to monitor a first resource, the first request specifying a plurality of temporal thresholds for decommissioning the first resource;
obtain, for the first resource, usage data records specifying activity associated with the first resource;
determine, for the first resource, a period of inactivity;
determine whether the period of inactivity is greater than a temporal threshold such that:
when the period of inactivity is greater than
a first temporal threshold, one or more policies associated with the first resource are modified to specify a level of access to the first resource;
when the period of inactivity is greater than a second temporal threshold, whereby the second temporal threshold is greater than the first temporal threshold, the first resource is archived; and
when the period of inactivity is greater than a third temporal threshold, whereby the third temporal threshold is greater than the first temporal threshold and the second temporal threshold, the first resource is deleted;
obtain a second request to reactivate a second resource; and
as a result of the second resource being disabled or archived due to the period of inactivity being greater than the period of time second temporal threshold, reactivate, upon receipt of the second request, the second resource.

6. The system of claim 5, further comprising generating a policy associated with the first resource that supersedes existing policies associated with the first resource to cause any request to access the first resource to be denied.

7. The system of claim 5, wherein the instructions that cause the system to reactivate the second resource further cause the system to:
on a condition that the second resource was previously disabled, reactivate access to the second resource; and
on a condition that the second resource was previously archived, transfer the second resource from an archival location to a computer system where the second resource was made available prior to being archived.

8. The system of claim 5, wherein the instructions further cause the system to:
determine whether the period of inactivity is greater than the second period of time threshold; and
when the period of inactivity is greater than the second period of time threshold, archive the first resource.

9. The system of claim 8, wherein the instructions further cause the system to:
determine whether the first period of time is greater than a third period of time threshold, whereby the third period of time threshold is greater than the first period of time threshold and the second period of time threshold; and
when the first period of time is greater than the third period of time threshold, delete the first resource.

10. The system of claim 8, wherein the instructions further cause the system to transmit one or more executable instructions to a computer system of the first resource that, when executed by the computer system of the first resource, cause the computer system of the first resource to archive the first resource by transferring the first resource to an archive storage system.

11. The system of claim 5, wherein the instructions further cause the system to transmit one or more executable instructions to an aggregator associated with a computer system of the first resource that, when executed by the aggregator, cause the aggregator to:
obtain, from the computer system of the first resource, usage data specifying user interactions with the first resource;
aggregate the usage data to generate one or more usage data records for the first resource; and
transmit the one or more usage data records to the system.

12. The system of claim 5, wherein:
the first request specifies one or more notification settings for transmitting one or more notifications if the first resource is disabled in response to the first resource being inactive for a longer time than the first period of time threshold; and
the instructions further cause the system to transmit a notification if the first resource is disabled.

13. A non-transitory computer-readable storage medium storing thereon executable instructions that, as a result of being executed by one or more processors of a computer system, cause the computer system to:
obtain a first request to monitor a first resource, the first request specifying a plurality of temporal thresholds for decommissioning the first resource;
obtain, for the first resource, usage data records specifying activity associated with the first resource;
determine, for the first resource, a period of inactivity;
determine whether the period of inactivity is greater than a temporal threshold such that:
when the period of inactivity is greater than a first temporal threshold, one or more policies associated with the first resource are modified to specify a level of access to the first resource;
when the period of inactivity is greater than a second temporal threshold, whereby the second temporal threshold is greater than the first temporal threshold, the first resource is archived; and
when the period of inactivity is greater than a third temporal threshold, whereby the third temporal threshold is greater than the first temporal threshold and the second temporal threshold, the first resource is deleted;
obtain a second request to reactivate a second resource; and
as a result of the second resource being disabled or archived due to the period of inactivity being greater than the second temporal threshold, reactivate, upon receipt of the second request, the second resource.

14. The non-transitory computer-readable storage medium of claim 13, wherein the executable instructions further cause the computer system to:

determine whether the first resource has been inactive for a third period of time greater than the second temporal threshold; and when the third period of time is greater than the second temporal threshold, perform a second operation that includes transmitting second instructions to a computer system associated with the first resource to transfer the first resource to another computer system inaccessible to users submitting requests to access the first resource.

15. The non-transitory computer-readable storage medium of claim 13, wherein the executable instructions that cause the computer system to reactivate the second resource further cause the computer system to:

as a result of the second resource being disabled, reinstate access to the second resource; and as a result of the second resource being archived, transfer the second resource from an archival storage location to a computer system utilized by the second resource prior to the second resource being archived.

16. The non-transitory computer-readable storage medium of claim 13, wherein determining whether the first resource has been inactive for the period of inactivity is performed in response to a request to monitor the first resource for decommissioning, the request specifying the first temporal threshold.

17. The non-transitory computer-readable storage medium of claim 13, wherein the executable instructions, further as a result of the second resource being disabled or archived, further cause the computer system to transmit a notification to an administrator of the first resource.

18. The non-transitory computer-readable storage medium of claim 13, wherein the executable instructions further cause the computer system to:

obtain, from one or more usage aggregators associated with the first resource, usage data for the first resource; and utilize the usage data to determine the period of inactivity during which the first resource was inactive.

19. The non-transitory computer-readable storage medium of claim 13, wherein the executable instructions, further when the period of inactivity is greater than the first temporal threshold, further cause the computer system to generate a policy associated with the first resource such that, in response to requests to access the first resource, the requests are denied based at least in part on the policy.

20. The non-transitory computer-readable storage medium of claim 13, wherein the executable instructions further cause the computer system to:

determine whether the first resource has been inactive for an amount of time greater than the second temporal threshold; and when the amount of time is greater than the second temporal threshold, perform a second operation that includes deleting the first resource.

\* \* \* \* \*